(12) United States Patent
Zheng et al.

(10) Patent No.: US 12,423,137 B1
(45) Date of Patent: Sep. 23, 2025

(54) COMPILER MANAGED TENSOR PARALLEL EXECUTION

(71) Applicant: Amazon Technologies, Inc., Seattle, WA (US)

(72) Inventors: Hongbin Zheng, San Jose, CA (US); Yuwen Jia, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 18/066,632

(22) Filed: Dec. 15, 2022

(51) Int. Cl.
*G06F 9/48* (2006.01)
*G06F 9/30* (2018.01)
*G06F 9/38* (2018.01)

(52) U.S. Cl.
CPC .......... *G06F 9/4881* (2013.01); *G06F 9/3004* (2013.01); *G06F 9/3838* (2013.01)

(58) Field of Classification Search
None
See application file for complete search history.

(56) References Cited

U.S. PATENT DOCUMENTS

| | | | | |
|---|---|---|---|---|
| 10,073,816 | B1 * | 9/2018 | Lu | G06F 17/14 |
| 10,216,704 | B1 * | 2/2019 | Lu | G06N 3/063 |
| 10,884,707 | B1 * | 1/2021 | Li | G06F 8/4441 |
| 11,645,358 | B2 * | 5/2023 | Chatterjee | G06F 17/16 706/15 |
| 11,803,360 | B2 * | 10/2023 | Wu | G06F 17/16 |
| 2017/0060811 | A1 * | 3/2017 | Yang | G06F 9/345 |
| 2019/0227750 | A1 * | 7/2019 | Srinivasan | G06F 3/0659 |
| 2019/0228809 | A1 * | 7/2019 | Srinivasan | G06F 12/0207 |
| 2020/0042875 | A1 * | 2/2020 | Shazeer | G06F 16/9024 |
| 2020/0117999 | A1 * | 4/2020 | Yoon | G06N 3/10 |
| 2020/0133531 | A1 * | 4/2020 | Subramaniam | G06F 9/5027 |
| 2021/0056389 | A1 * | 2/2021 | Yang | G06N 3/063 |
| 2021/0064987 | A1 * | 3/2021 | Springer | G06N 3/08 |
| 2021/0117806 | A1 * | 4/2021 | Liu | G06N 3/105 |

(Continued)

OTHER PUBLICATIONS

Abdelfattah et al.; "High-Performance Tensor Contractions for GPUs", Published by Elsevier B.V., ICCS 2016; doi: 10.1016/j.procs.2016.05.302; (Abdelfattah_2016.pdf; pp. 108-118) (Year: 2016).*

(Continued)

*Primary Examiner* — Hiren P Patel
(74) *Attorney, Agent, or Firm* — Weaver Austin Villeneuve & Sampson LLP

(57) ABSTRACT

Techniques for implementing tensor parallel execution can include identifying a first tensor contraction operation in a compute flow, and slicing the first tensor contraction operation into a first set of multiple tensor contraction portions to have each compute engine of multiple compute engines perform a portion of the first tensor contraction operation. A set of slicing options can then be determined for a second tensor contraction operation that operates on a tensor result of the first tensor contraction operation. A cost for each slicing option is determined, and a slicing option having the lowest cost is selected. The second tensor contraction operation is sliced according to the selected slicing option to have each compute engine perform a portion of the second tensor contraction operation. Collective compute operations can be inserted in the compute flow for the first and second tensor contraction operations.

19 Claims, 12 Drawing Sheets

(56) References Cited

U.S. PATENT DOCUMENTS

| | | | | |
|---|---|---|---|---|
| 2021/0209270 A1* | 7/2021 | Huang | ............... | G06F 30/20 |
| 2022/0012573 A1* | 1/2022 | Nagendran | ............ | G06N 3/045 |
| 2022/0108156 A1* | 4/2022 | Hunter | ................ | G06N 3/048 |
| 2022/0121959 A1* | 4/2022 | Kolhe | .................. | G06N 3/10 |
| 2022/0391571 A1* | 12/2022 | Dhand | ................ | G06N 10/20 |
| 2023/0177120 A1* | 6/2023 | Papandreou | ............ | G06N 5/01 |
| | | | | 707/737 |
| 2023/0229916 A1* | 7/2023 | Chechik | ............... | G06N 5/01 |
| | | | | 706/25 |
| 2023/0385077 A1* | 11/2023 | Wang | .................. | G06F 7/5443 |
| 2023/0409520 A1* | 12/2023 | Wang | ................... | G06F 8/433 |
| 2023/0419145 A1* | 12/2023 | Panteleev | ............. | G06N 10/00 |
| 2024/0168915 A1* | 5/2024 | Du | ....................... | G06F 15/825 |

OTHER PUBLICATIONS

Poya et al.; "A high performance data parallel tensor contraction framework: Application to coupled electro-mechanics"; © 2017 Elsevier B.V; http://dx.doi.org/10.1016/j.cpc.2017.02.016; (Poya_2017.pdf; pp. 35-52) (Year: 2017).*

Ma et al.; "Optimizing tensor contraction expressions for hybrid CPU-GPU execution"; © Springer Science + Business Media, LLC 2011; DOI 10. 1007/s10586-011-0179-2; (Ma_2011.pdf; pp. 131-155) (Year: 2011).*

Rajbhandari et al.; "A Communication-Optimal Framework for Contracting Distributed Tensors"; © 2014 IEEE; DOI 10.1109/SC.2014.36; (Rajbhandari_2014.pdf; pp. 375-386) (Year: 2014).*

"Collective Operations," NVIDIA Collective Communication Library (NCCL) Documentation, NCCL 2.16.2, Dec. 9, 2022, 3 pages, URL: https://docs.nvidia.com/deeplearning/nccl/archives/nccl_2162/user-guide/docs/usage/collectives.html.

* cited by examiner slice along left tensor free axis

Compute Engine 1:

Compute Engine 2:

slice along right tensor free axis

Compute Engine 1:

Compute Engine 2:

COMPILER MANAGED TENSOR PARALLEL EXECUTION

BACKGROUND

Neural networks utilize computational models to perform complex tasks such as image recognition, natural language processing, among others. A neural network can involve various computations such as matrix multiplication operations, activation operations, pooling operations, etc. Neural networks can be executed on specialized hardware such as neural network accelerators that have circuitry tailored to perform common neural network computations.

BRIEF DESCRIPTION OF THE DRAWINGS

Various embodiments in accordance with the present disclosure will be described with reference to the drawings, in which.

DETAILED DESCRIPTION

Execution of neural network models may involve performing tensor contraction operations (e.g., batch matrix multiplications) with large weigh tensors over one or more batches of input data. To accelerate the computations through hardware parallelism, a tensor contraction operation can be sliced into smaller portions to be executed on respective compute engines. Distributing the workload amongst multiple compute engines can reduce computational latency because the smaller compute portions can be performed in parallel. Utilizing multiple compute engines also allows input data and/or intermediate data that cannot fit into a single compute engine to be processed together in the multiple compute engines.

Tensor-parallelism refers to slicing a larger tensor in smaller tensor portions, and distributing the tensor portions to respective compute engines for processing. A tensor can be sliced along a row-major axis or along a column-major axis. When a tensor is used in a tensor contraction operation, different slicing options can have different implications. Choosing a non-ideal slicing option can adversely impact the overall performance and offset the gains in parallel processing due to the communication overhead for exchanging data between the compute engines. Furthermore, when the result of a tensor contraction is used in a subsequent tensor contraction, slicing the tensors in a mismatched manner can incur excessive overhead to rearrange the result for the subsequent tensor contraction.

The techniques disclosed herein provide a compiler with the capability to manage tensor parallel execution of a neural network model. When the compiler analyzes a neural network model, tensor contraction operations can be identified, and tensor slicing options can be assessed using a cost function to determine a suitable slicing dimension. By implementing the tensor-parallelism capability in the compiler, the cost function can consider the impact of slicing a tensor on subsequent operations, given the compiler's awareness of the computational flow of the neural network model. For instance, the cost function can take into account tensor contraction operations that depend on other tensor contraction operations to mitigate against overhead to resolve slicing mismatch between the tensor contractions. The tensor slicing can be propagated along the computational flow to slice the compute workload into multiple portions for parallel execution.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
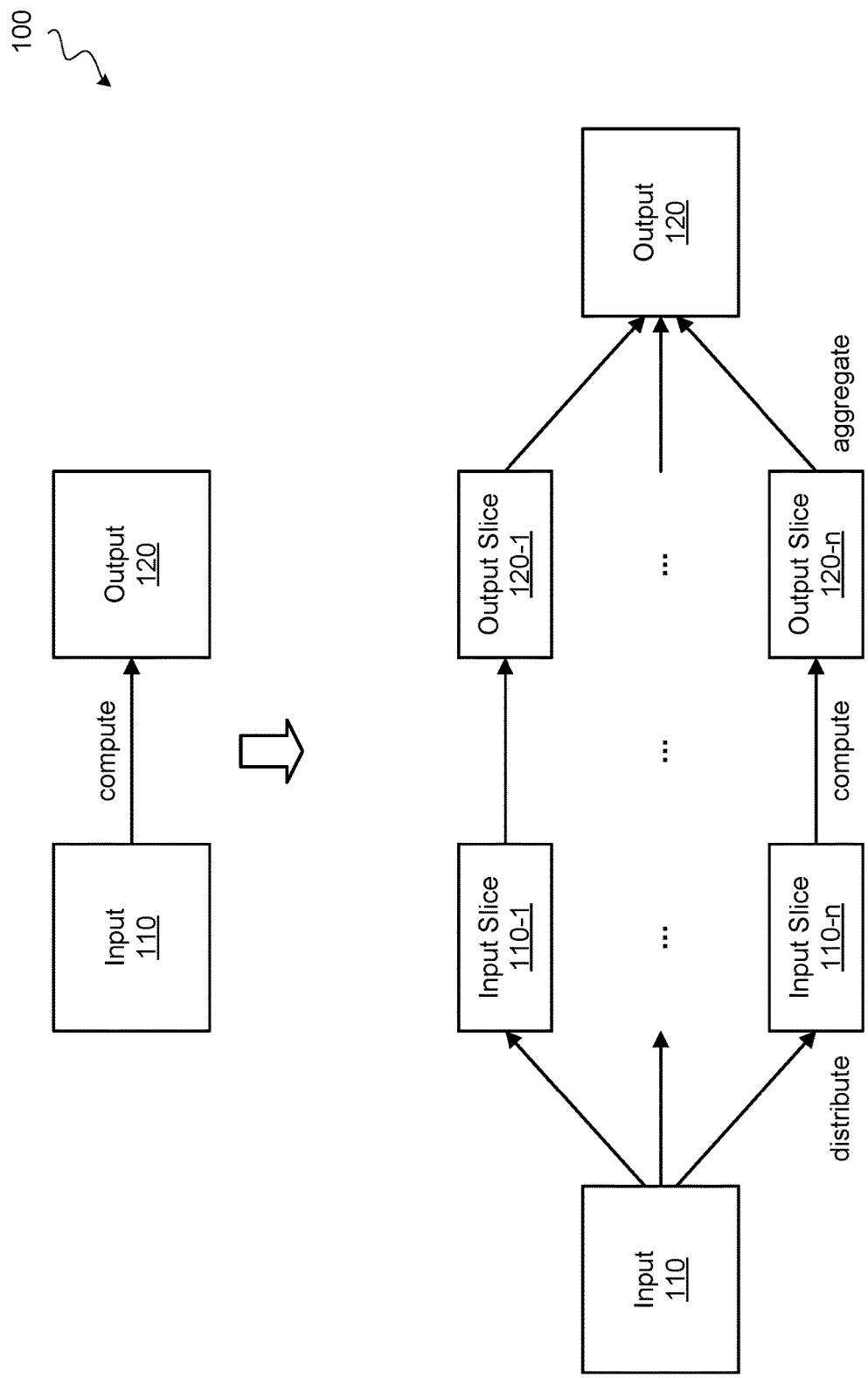
FIG. 1 illustrates a conceptual diagram of an example of compute parallelism.

FIG. 1 illustrates a conceptual diagram 100 of compute parallelism. A single compute engine can perform computations on input data 110 to generate output data 120. However, depending on the amount of input data 110, the compute capability of the compute engine, and the memory capacity of the compute engine, multiple compute passes may be needed to generate output data 120 from input data 110. To reduce the amount of compute allocated to a compute engine, the workload can be distributed across multiple compute engines. For example, the input data 110 can be split into a set of input data slices 110-1 to 110-n, in which n is the number of compute engines available. The input data slices 110-1 to 110-n can be distributed to the respective n number of compute engines. Each compute engine can perform a portion of the overall computations on the corresponding input data slice to generate a set of output data slices 120-1 to 120-n. The output data slices 120-1 to 120-n can then be aggregated together to produce output data 120.

By distributing the compute workload to multiple compute engines, the compute latency can be reduced. The amount of compute performed by each compute engine is reduced as compared to performing all of the compute in a single compute engine, and the compute allocated by each compute engine can be performed in parallel. Moreover, by slicing the input data into smaller portions, the memory capacity limitations of a single compute engine can also be alleviated. However, as shown in FIG. 1, implementing compute parallelism incurs overhead to distribute the input data slices 110-1 to 110-n, and aggregating the output data slices 120-1 and 120-n. As such, to take full advantage of parallelizing the compute workload, the compute slicing should be balanced with the overhead cost of implementing the compute slicing.

Figure 2:
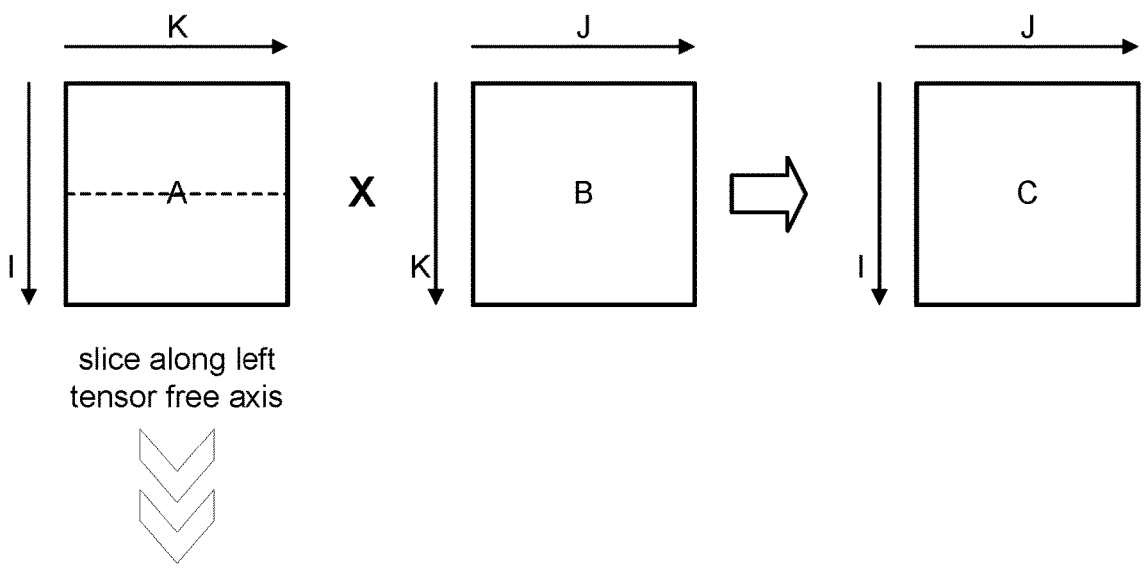
FIG. 2 illustrates a conceptual diagram of an example of slicing a tensor contraction operation.
Figure 2:
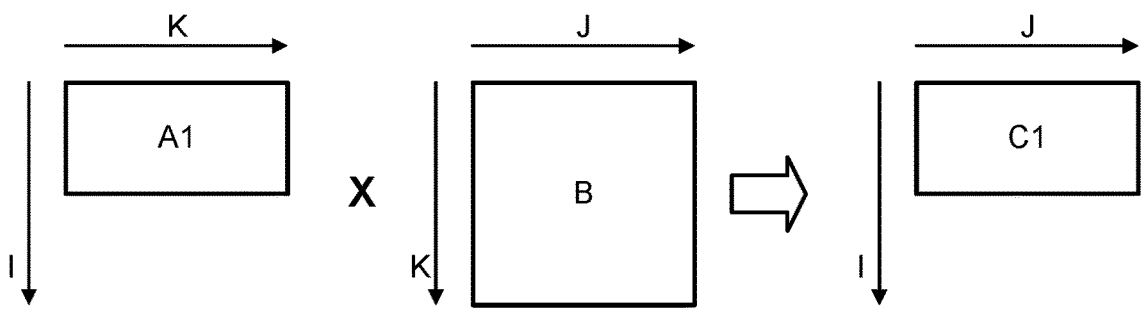
Figure 2:
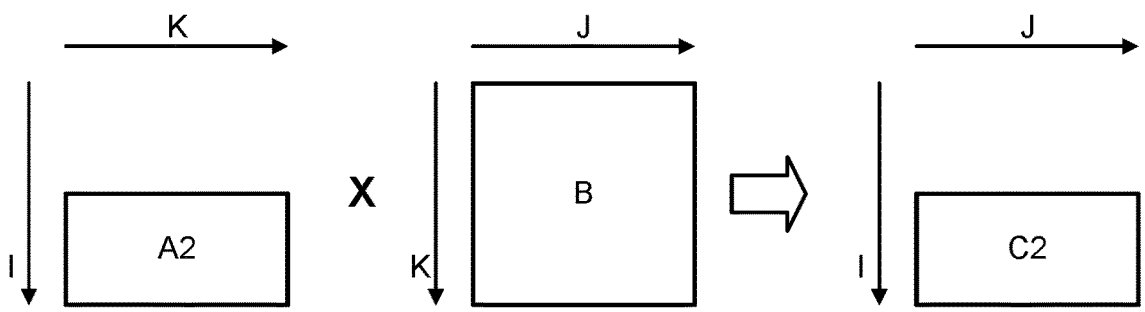

FIG. 2 illustrates an example of slicing a tensor contraction operation. In the example of FIG. 2, a left tensor A is multiplied with a right tensor B to generate a tensor result C. Left tensor A can be an I×K tensor, and the right tensor B can be a K×J tensor. The tensor result C can be an I×J tensor. The dimension of the I axis of left tensor A is retained in tensor result C, and thus the I axis of the left tensor A can be referred to as the left tensor free axis. The dimension of the J axis of right tensor B is retained in tensor result C, and thus the J axis of the right tensor B can be referred to as the right tensor free axis. The K axes in the left tensor A and the right tensor B are not retained in the tensor result C. As such, the K axis can be referred to as the contracted axis.

In the example of FIG. 2, the tensor contraction operation is sliced along the left tensor free axis I. For example, if the compute is distributed to two compute engines, slicing along the left tensor free axis will produce two sub-tensors A1 and A2. Each of sub-tensors A1 and A2 has the dimensions of I/2×K. The number of sub-tensors corresponds to the number of compute engines, and the dimensions of the sub-tensors are proportional to the number of compute engines. Hence, for n number of compute engines, n number of sub-tensors are generated and each of the sub-tensors can have the dimensions of I/n×K. If the dimension I is not divisible evenly by n, some of the sub-tensors can have fewer rows than others. In some implementations, zeros can be used to pad the sub-tensors such that each sub-tensors has the same dimensions.

Slicing the left tensor into the two sub-tensors A1 and A2 allows the tensor contraction computation to be distributed to the two compute engines as two tensor contraction portions, respectively. The first compute engine can multiply sub-tensor A1 with the right tensor B to generate a partial tensor result C1, which is an I/2×J tensor corresponding to the top half of tensor result C. The second compute engine can multiply sub-tensor A2 with the right tensor B to generate a partial tensor result C2, which is another I/2×J tensor corresponding to the bottom half of tensor result C. Hence, slicing along the left tensor free axis may incur the overhead communication cost of the collective compute operations to scatter the left tensor A to each compute engine, duplicate the right tensor B to each compute engine, and concatenate the outputs of the tensor contraction portions C1 and C2 to obtain the tensor result C.

Figure 3:
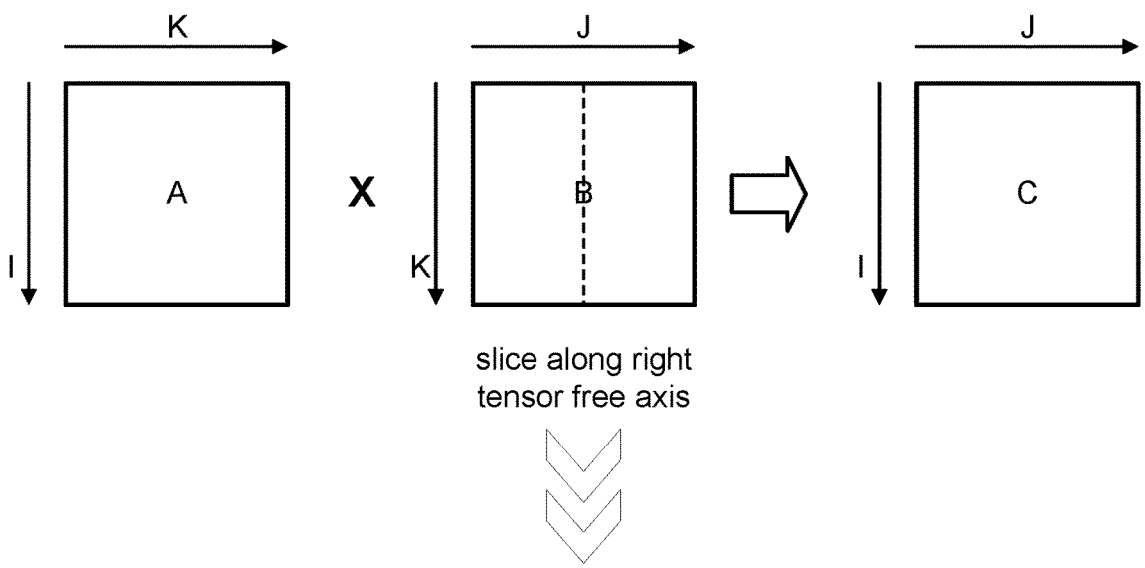
FIG. 3 illustrates a conceptual diagram of another example of slicing a tensor contraction operation.
Figure 3:
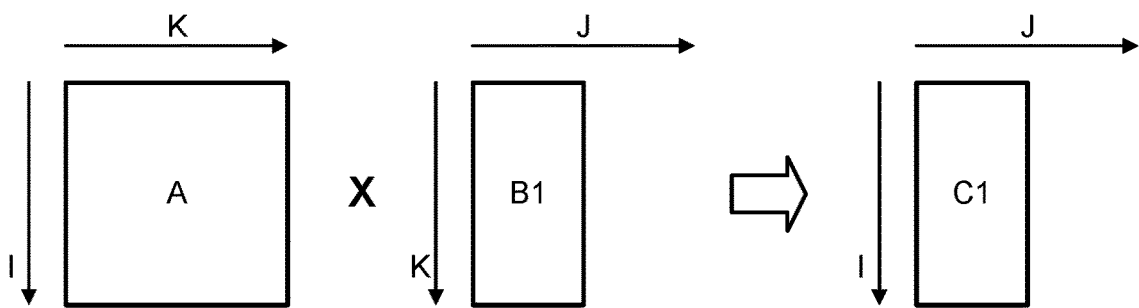
Figure 3:
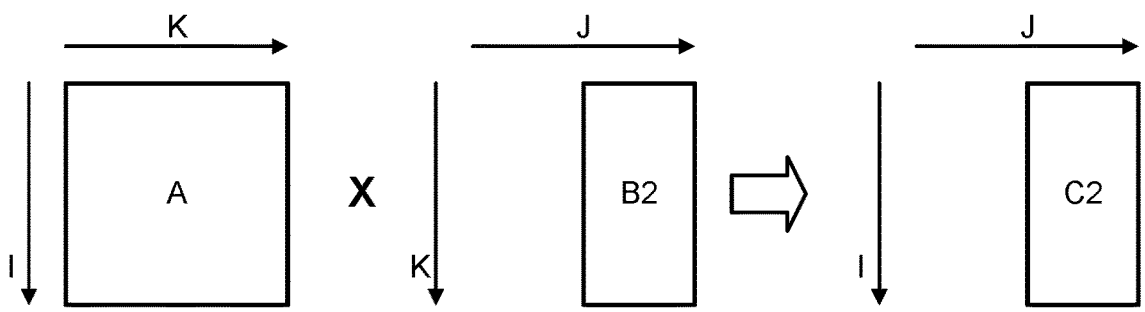

FIG. 3 illustrates another example of slicing a tensor contraction operation. Similar to the above example, a left tensor A is multiplied with a right tensor B to generate a tensor result C. Left tensor A can be an I×K tensor, and the right tensor B can be a K×J tensor. The tensor result C can be an I×J tensor. However, in the example of FIG. 3, the tensor contraction operation is sliced along the right tensor free axis J. For example, if the compute is distributed to two compute engines, slicing along the right tensor free axis will produce two sub-tensors B1 and B2. Each of sub-tensors B1 and B2 has the dimensions of K×J/2. As with the example above, the number of sub-tensors corresponds to the number of compute engines, and the dimensions of the sub-tensors are proportional to the number of compute engines.

Slicing the right tensor into the two sub-tensors B1 and B2 allows the tensor contraction computation to be distributed to the two compute engines as two tensor contraction portions, respectively. The first compute engine can multiply the left tensor A with the sub-tensor B1 to generate a partial tensor result C1, which is an I×J/2 tensor corresponding to the left half of tensor result C. The second compute engine can multiply the left tensor A with the sub-tensor B2 to generate a partial tensor result C2, which is another I×J/2 tensor corresponding to the right half of tensor result C. Hence, slicing along the right tensor free axis may incur the overhead communication cost of the collective compute operations to duplicate the left tensor A to each compute engine, scatter the right tensor B to each compute engine, and concatenate the outputs of the tensor contraction portions C1 and C2 to obtain the tensor result C.

Figure 4:
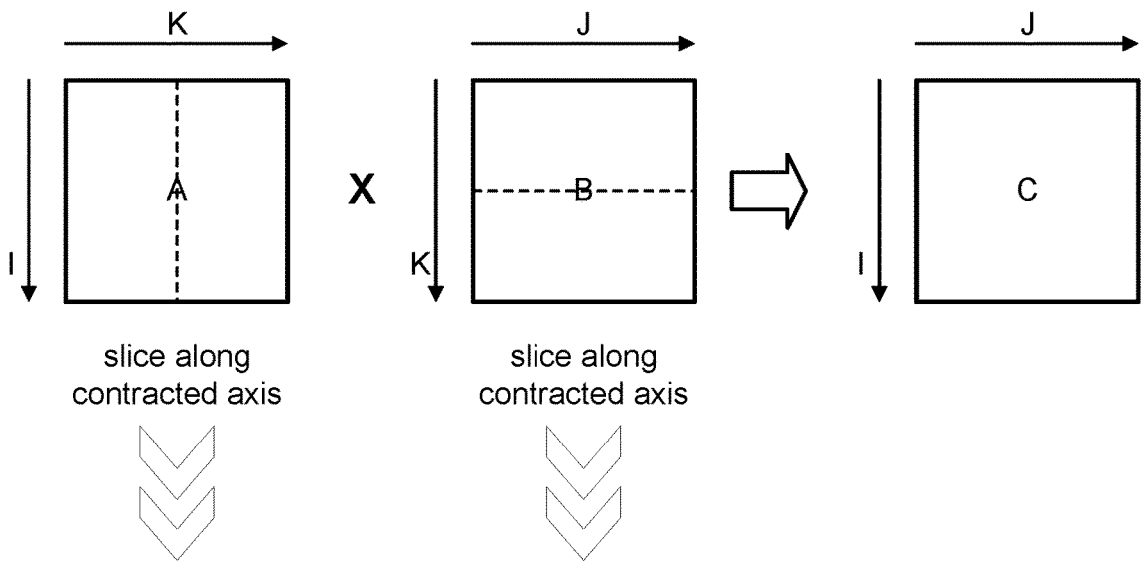
FIG. 4 illustrates a conceptual diagram of a further example of slicing a tensor contraction operation.
Figure 4:
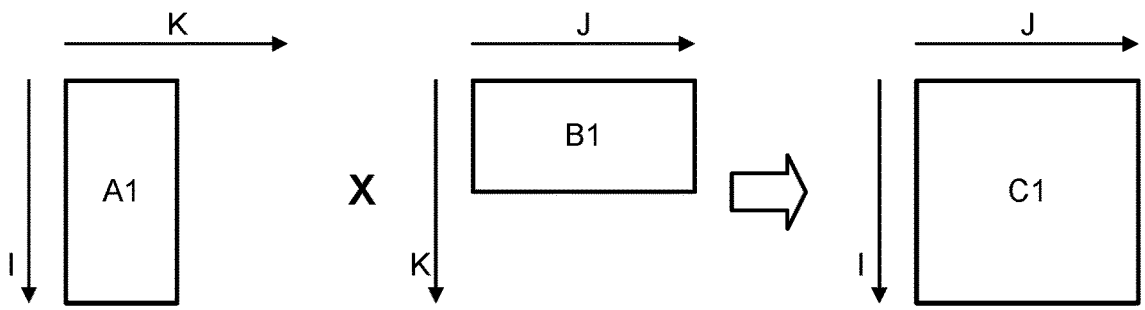
Figure 4:
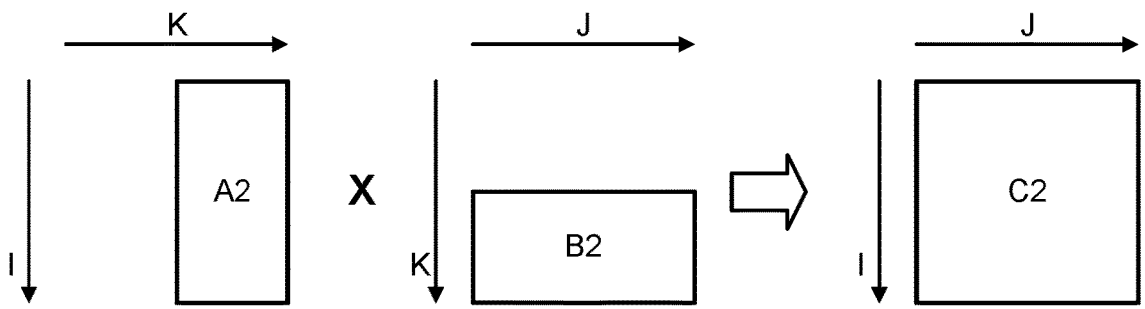

FIG. 4 illustrates a further example of slicing a tensor contraction operation. Similar to the above example, a left tensor A is multiplied with a right tensor B to generate a tensor result C. Left tensor A can be an I×K tensor, and the right tensor B can be a K×J tensor. The tensor result C can be a I×J tensor. However, in the example of FIG. 4, the tensor contraction operation is sliced along the contracted axis K. For example, if the compute is distributed to two compute engines, slicing along the contracted axis will produce two left sub-tensors A1 and A2, and two right sub-tensors B1 and B2. Each of sub-tensors A1 and A2 has the dimensions of I×K/2, and each of sub-tensors B1 and B2 has the dimensions of K/2×J. The number of sub-tensors generated from each tensor corresponds to the number of compute engines, and the dimensions of the sub-tensors are proportional to the number of compute engines.

Slicing along the contracted axis to generate the two sub-tensors A1 and A2 and the two sub-tensors B1 and B2 allows the tensor contraction computation to be distributed to the two compute engines as two tensor contraction portions, respectively. The first compute engine can multiply the sub-tensor A1 with the sub-tensor B1 to generate a partial tensor result C1, which is an I×J tensor containing a first set of partial sums of tensor result C. The second compute engine can multiply the sub-tensor A2 with the sub-tensor B2 to generate a partial tensor result C2, which is another I×J tensor containing a second set of partial sums of tensor result C. Generating the tensor result C from partial tensor results C1 and C2 involves more than a concatenation of the partial tensor results. An All-Reduce operation can be used to merge the partial sums from the two partial tensor results C1 and C2 to generate the tensor result C. Hence, slicing along the contracted axis may incur the overhead communication cost of the collective compute operations to scatter the left tensor A to each compute engine, scatter the right tensor B to each compute engine, and perform an All-Reduce operation on the outputs of the tensor contraction portions C1 and C2 to obtain the tensor result C.

Figure 5:
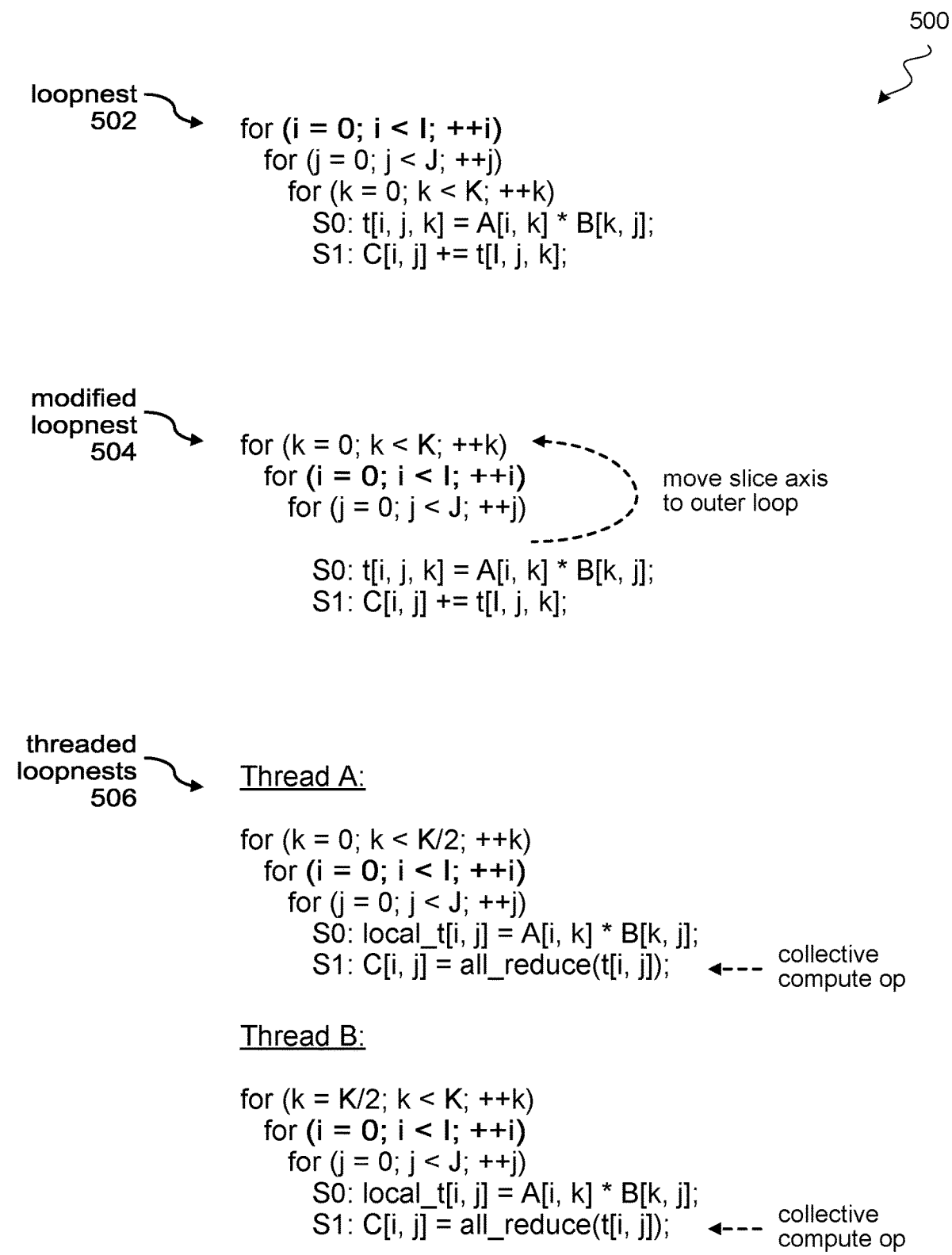
FIG. 5 illustrates an example of slicing a tensor contraction operation in an intermediate representation.

FIG. 5 illustrates an example of slicing tensor contraction operation in an intermediate representation (IR) of a neural network model. When a compiler obtains a description of a neural network model written in a programming language, the compiler can compile the programming code into an IR of the neural network model. For example, the compiler may convert tensor contraction operations into affine loopnests. By representing tensor contraction operations as affine loopnests, optimization techniques such as integer linear programming (ILP) can be used optimize the executable code of the neural network model.

Loopnest 502 is an example of an affine loopnest representing the tensor contraction operation of multiplying a left tensor A with a right tensor B to generate a tensor result C. Left tensor A is an I×K tensor, and right tensor B is a K×J tensor. The tensor result C is an I×J tensor. The loop index i indexes into the left tensor free axis I, the loop index j indexes into the right tensor free axis J, and the loop index k indexes into the contracted axis K.

To slice loopnest 502, and hence the tensor contraction operation, the loop corresponding to the slice axis is moved to the outermost loop. In the example shown in FIG. 5, the tensor contraction operation is being sliced along the contracted axis K. Hence, the loop containing the loop index k is moved to the outermost loop to derive modified loopnest 504.

Upon setting the axis being sliced to the outermost loop, the outermost loop can be parallelized into separate threads. For example, when slicing loopnest 502 for two compute engines, the threaded loopnests 506 may include thread A that loops over the first half of K, and thread B that loops over the second half of K. Collective compute operation(s) can be inserted (if needed) to merge the results from the two threads to generate the tensor result. As shown in FIG. 5, given that the compute slice is performed along contracted axis K, the All-Reduce operation is inserted at the end of the threaded loopnests to merge the partial tensor contraction results. The two threaded loopnests can be assigned different thread identifiers or device identifiers to allow the different compute engines to execute their respective threads.

In some scenarios, the tensor result of one tensor contraction can be used as an input operand of a subsequent tensor contraction operation. When considering two tensor contraction operations, there can be nine different slicing options because each of the two tensor contraction operations has three slicing options: (1) slice along the left tensor free axis; (2) slice along the right tensor free axis; or (3) slice along the contracted axis. Different combinations of slicing can incur different overhead or cost to resolve slicing mismatch between the two tensor contraction operations.

Figure 6:
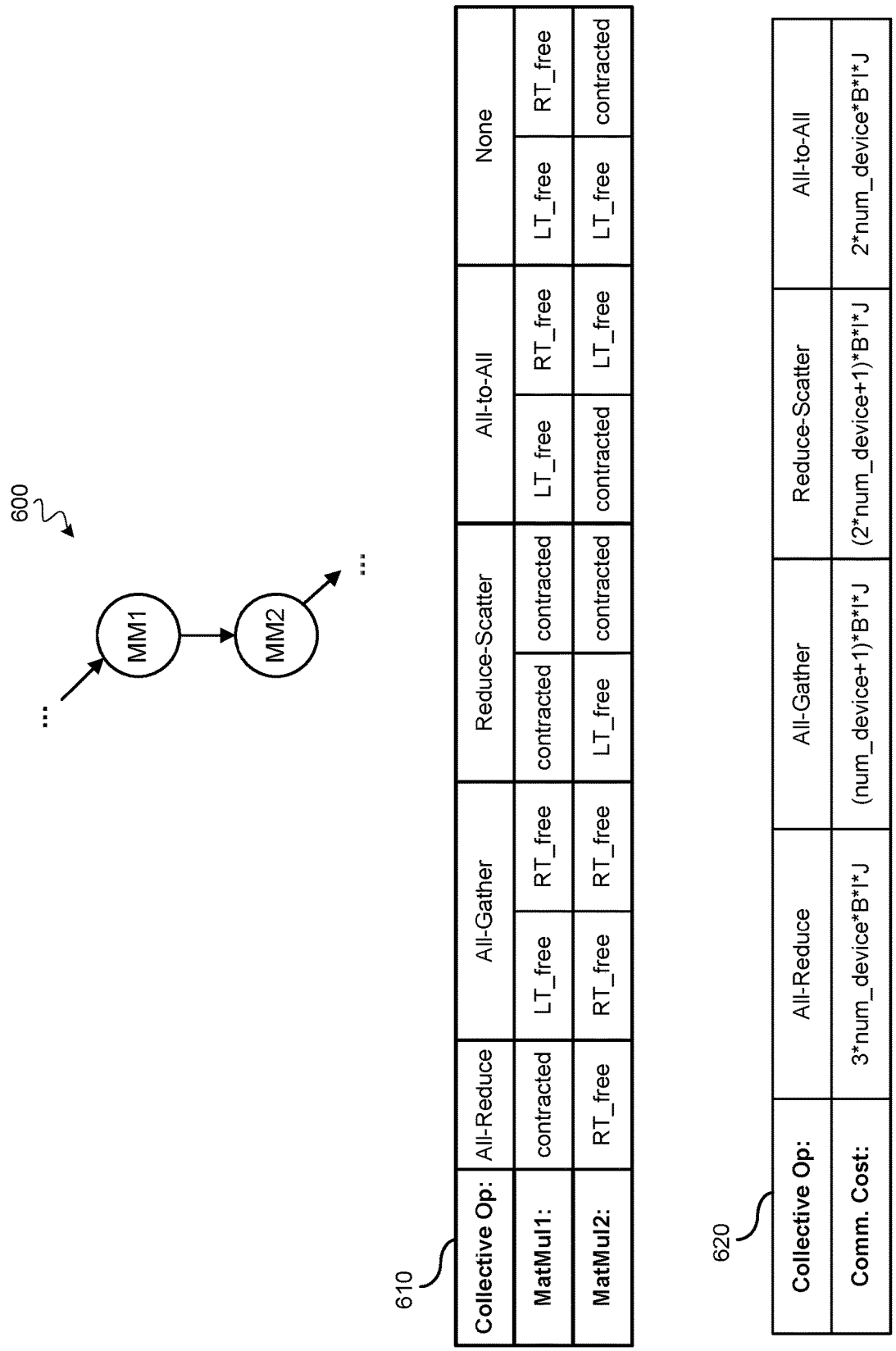
FIG. 6 illustrates examples of the cost for slicing multiple tensor contraction operations.

FIG. 6 illustrates an example of a portion of a compute flow graph 600. Compute flow graph 600 can be part of much larger compute flow graph representing a neural network model. Compute flow graph 600 may include nodes representing operators such as tensor contraction operations, and edges connecting the nodes representing data dependencies. In the example shown, the MM1 node represents a first tensor contraction operation MatMul1, and the MM2 node represents a second tensor contraction operation MatMul2 that uses the tensor output of MatMul1 as an input. The various collective compute operations used to resolve slicing mismatch between the two tensor contraction operations are shown in table 610.

By way of example, when both the first tensor contraction operation MM1 and the second tensor contraction operation MM2 are sliced along the left tensor free axis (LT free), no additional collective compute operation is needed to resolve slicing mismatch. This is because the output of the first tensor contraction operation MatMul1 is already distributed in the manner that the second tensor contraction operation MatMul2 is being sliced. Referring back to FIG. 2 that illustrates slicing along the left tensor free axis, when the first tensor contraction operation MatMul1 is sliced in this manner, the partial tensor results C1 and C2 are generated in respective compute engines. The partial tensor results C1 and C2 corresponds to splitting the tensor result C horizontally. Performing the second tensor contraction operation MatMul2 using tensor result C as the left tensor and slicing along the left tensor free axis would mean that no additional collective compute operation is needed to aggregate and redistribute the tensor result of the first tensor contraction operation MatMul1 into the respective compute engines. This is because the partial tensor results of the first tensor contraction operation MatMul1 have already been generated in the respective compute engines in the same manner as slicing the second tensor contraction operation MatMul2 along the left tensor free axis.

A similar outcome occurs when slicing the first tensor contraction operation MatMul1 along the right tensor free axis (RT_free) and the second tensor contraction operation MatMul2 along the contracted axis. Referring back to FIG. 3 that illustrates slicing along the right tensor free axis, when the first tensor contraction operation MatMul1 is sliced in this manner, the partial tensor results C1 and C2 are generated in respective compute engines. The partial tensor results C1 and C2 corresponds to slicing the tensor result C vertically. Referring to FIG. 4 that illustrates slicing along the contracted axis, performing the second tensor contraction operation MatMul2 using tensor result C as the left tensor and slicing along the contracted axis would mean that no additional collective compute operation is needed to aggregate and redistribute the tensor result of the first tensor contraction operation MatMul1. This is because the partial tensor results of the first tensor contraction operation MatMul1 have already been generated in the respective compute engines in the same manner as slicing the second tensor contraction operation MatMul2 along the contracted axis.

In contrast, other combinations of slicing dimensions may require insertion of a collective compute operation to resolve slicing mismatch between two tensor contraction operations. For instance, referring to table 610, an All-Reduce collective compute operation can be added to resolve slicing mismatch when slicing the first tensor contraction operation MatMul1 along a contracted axis and the second tensor contraction operation MatMul2 along a right tensor free axis. An All-Gather collective compute operation can be added to resolve slicing mismatch when slicing the first tensor contraction operation MatMul1 along a left tensor free axis and the second tensor contraction operation MatMul2 along a right tensor free axis, or slicing both the first and second tensor contraction operations MatMul1 and MatMul2 along respective right tensor free axes. A Reduce-Scatter collective compute operation can be added to resolve slicing mismatch when slicing the first tensor contraction operation MatMul1 along a contracted axis and the second tensor contraction operation MatMul2 along a left tensor free axis, or slicing both the first and second tensor contraction operations MatMul1 and MatMul2 along respective contracted axes. An All-to-All collective compute operation can be added to resolve slicing mismatch when slicing the first tensor contraction operation MatMul1 along a left tensor free axis and the second tensor contraction operation MatMul2 along a contracted axis, or slicing the first tensor contraction operation MatMul1 along a right tensor free axis and the second tensor contraction operation MatMul2 along a right tensor free axis.

Table 620 illustrates the communication costs for the various collective compute operations used to resolve slicing mismatch between tensor contraction operations. The communication costs are associated with aggregating data from the partial tensor results of the first tensor contraction operation MatMul1, and distributing the tensor result to the compute engines in the manner the second tensor contraction operation MatMul2 is being sliced. The communication costs can be based on the number of compute engines (num_device), the tensor result dimensions I×J, and the number of batches B. The All-Reduce collective compute operation may incur a communication cost of (num_device*3*B*I*J). The All-Gather collective compute operation may incur a communication cost of ((num_device+1)*B*I*J). The Reduce-Scatter collective compute operation may incur a communication cost of ((2*num_device+1)*B*I*J). The All-to-All collective compute operation may incur a communication cost of (2*num_device*B*I*J). Taking into account the communication costs associated with the collective compute operations when determining which slicing option to implement for dependent tensor contraction operations can help minimize the overhead associated with slicing the tensor contraction operations.

Figure 7:
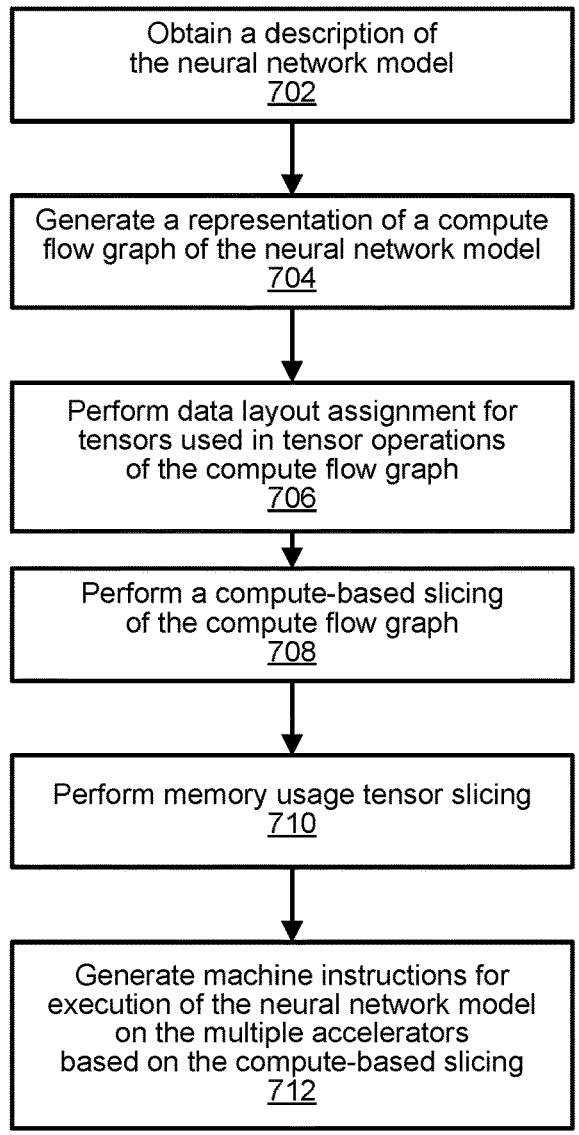
FIG. 7 illustrates a flow diagram of an example of a compilation process.

FIG. 7 illustrates a flow diagram of an example of a process 700 for compiling a neural network model. Process 700 can be performed, for example, by a compiler that interprets programming code describing the neural network model, and translates the programming code into machine instructions for execution on hardware (e.g., an integrated circuit device such as a neural network accelerator or an acceleration engine). In some implementations, process 700 can be implemented on a computer-readable medium that is executable by one or more processors of a computing system to compile the programming code of a neural network model for loading onto the integrated circuit device for execution.

Process 700 may begin by obtaining a description of a neural network model at block 702. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc. In some implementations, the description of the neural network model can be obtained from the local storage of the computing system executing the compiler, or from a remote storage over a network interface. A file name or a reference to the description of the neural network model can be provided with a command to invoke the compiler, or can be loaded into the compiler via a user interface.

At block 704, a representation of a compute flow graph of the neural network model is generated. The compute flow graph can be generated, for example, by generating an intermediate representation (IR) from the description of a neural network model (source code), and expanding operators in the IR into loopnests. The compute flow graph may include nodes corresponding to tensor operations, and edges connecting the nodes that correspond to data dependencies. The tensor operations may include tensor contraction operations, and the tensor contraction operations can be represented as affine loopnests. For example, a loopnest can be considered as affine if the indices of the elements accessed on each iteration are an affine function (linear plus constant) of the loop iterator variables.

At block 706, data layout assignment is performed for tensors used in the tensor operations of the compute flow graph. In some implementations, the data layout assignment can be performed using a frontier-based approach. In the frontier approach, tensor operations having a fixed data layout are initialized into initial layout groups. Frontier nodes (nodes adjacent to a layout group) having a lowest cost are iteratively merged with the layout groups until all the nodes are merged into a final data layout group having a compatible data layout. Merging a frontier node may include resolving data layout conflicts between loopnests having different data layouts by decaying an iteration axis or inserting a transpose operation (e.g., using fixed point iteration).

At block 708, a compute-based slicing of the compute flow graph is performed to distribute the compute workload to multiple compute engines. Examples of a compute engine may include a neural network accelerator, a graphics processing unit, a processor, etc.). The compute-based slicing can be performed on tensors after the data layout assignment of block 706 such that the compute-based slicing is consistent with the data layout assignment. The compute-based slicing may include identifying a set of tensor contraction operations in the compute flow graph. For each of the tensor contraction operation, the slicing option with the lowest cost is selected, and the selected slicing option is used to slice the tensor contraction operation into multiple tensor contraction portions.

The cost for slicing a tensor contraction operation may include the communication overhead to distribute tensor data to the multiple accelerators, and the communication overheard to aggregate tensor result portions from the multiple compute engines. The cost for slicing a tensor contraction operation that operates on a tensor result from a prior tensor contraction operation can include communication overhead to resolve slicing mismatches between the tensor contraction operation and the prior tensor contraction operation. The communication overhead may include, for example, a latency and/or synchronization penalty associated with collective compute operations to facilitate the data exchanges.

The slicing option selected for a tensor contraction operation can be propagated to adjacent tensor operations in the compute flow graph, and from those adjacent tensor operations to their neighboring tensor operations, and so on, to slice other tensor operations in the compute flow graph. In scenarios where two conflicting slicing options are propagated to the same tensor in the compute flow graph, a collective compute operation can be added to resolve the slicing conflict.

The multiple tensor contraction portions and the sliced tensor operations can then be assigned to multiple compute engines to have each compute engine perform a portion of the tensor contraction operations and sliced tensor operations. Collective compute operators such as those discussed above can be inserted into the intermediate representation of the neural network model to facilitate performing the tensor contraction operations and tensor operations in the multiple compute engines.

At block 710, additional tensor slicing can be performed after the compute-based slicing to keep memory usage of each compute engine to be within a memory capacity of the corresponding compute engine. For example, a linear scan based on loop-level live interval can be performed on the memory usage of the sliced compute flow graph of a single compute engine. If the memory usage still exceeds the available memory capacity of the single compute engine, additional tensor slicing can be performed to reduce the memory pressure of each compute engine.

At block 712, machine instructions for execution of the neural network model on multiple compute engines can be generated based on the compute-based slicing of the compute flow graph. For example, machine instructions can be derived from the loopnests and scheduled by a scheduler. The generated machine instructions may include threads assigned to different thread identifiers or device identifiers for each compute engine. The generated machine instructions can be in the form of compiled code in a binary format that can be loaded onto each compute engine for execution.

Figure 8:
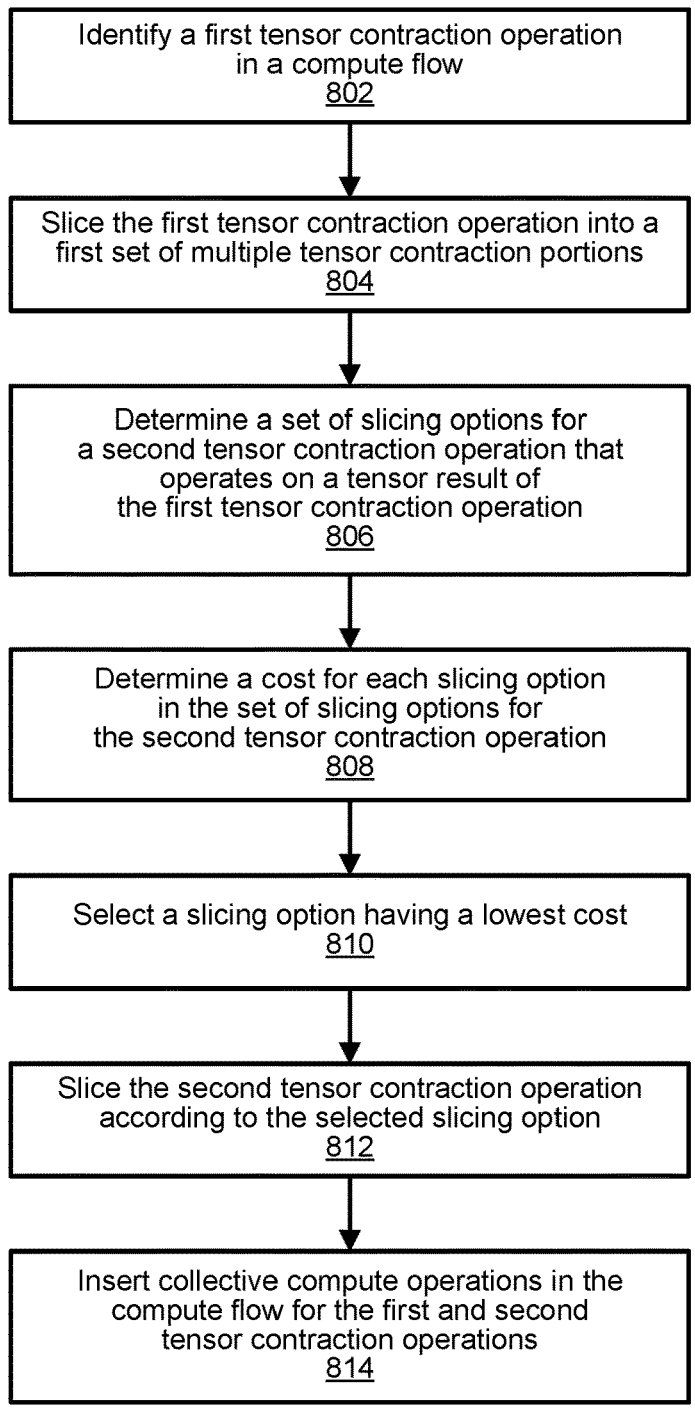
FIG. 8 illustrates a flow diagram of an example of a process for slicing tensor contraction operations.

FIG. 8 illustrates a flow diagram of an example of a process 800 for performing a compute-based slicing of tensor contraction operations. Process 800 can be performed, for example, by a compiler that interprets programming code describing the neural network model, and translates the programming code into machine instructions for execution on hardware (e.g., an integrated circuit device such as a neural network accelerator or an acceleration engine). In some implementations, process 800 can be implemented on a computer-readable medium that is executable by one or more processors of a computing system to compile the programming code of a neural network model for loading onto the integrated circuit device for execution. Process 800 can be performed as part of block 708 in process 700.

Process 800 may begin at block 802 by identifying a first tensor contraction operation in a compute flow. The compute flow can be part of a neural network model, and can be represented as a compute flow graph. The tensor contraction operation can be in the form of an affine loopnest. In some implementations, tensor contraction operation with large tensors (e.g., large loop variables) can be identified as candidates for compute slicing.

At block 804, the first tensor contraction operation is sliced into a first set of multiple tensor contraction portions to have each compute engine of multiple compute engines to perform a portion of the first tensor contraction operation. The first tensor contraction operation can be sliced along a left tensor free axis (e.g., similar to FIG. 2), sliced along a right tensor free axis (e.g., similar to FIG. 3), or sliced along the contracted axis (e.g., similar to FIG. 4). In some implementations, the first tensor contraction can be sliced in the intermediate representation (IR) of the compute flow in a similar manner as shown in the example of FIG. 5.

At block 806, a set of slicing options is determined for a second tensor contraction operation that operates on a tensor result of the first tensor contraction operation. The set of slicing options for the second tensor contraction operation may similarly include slicing along a left tensor free axis, a right matric free axis, or the contracted axes.

At block 808, a cost for each slicing option is determined for the second tensor contraction operation. The cost of a slicing option may include the cost to resolve slicing mismatch on the tensor result of the first tensor contraction operation. Different combinations of slicing options may use a different type of collective compute operation to resolve the slicing mismatch. For example, table 610 of FIG. 6 illustrates the various types of collective compute operations to use for the different combinations of slicing options. The communication cost associated with the different collective compute operations is shown in table 620 of FIG. 6.

At block 810, a slicing option having the lowest cost is selected for the second tensor contraction operation. At block 812, the second tensor contraction operation is sliced according to the selected slicing option to have each compute engine perform a portion of the second tensor contraction operation. For example, the first tensor contraction can be sliced in the intermediate representation (IR) of the compute flow in a similar manner as the example of FIG. 5.

At block 814, collective compute operations are inserted in the compute flow for the first and second tensor contraction operations. The collective compute operations may include scattering, duplicating, and/or concatenating the tensor data for multiple compute engines. Depending on the slicing options, more complex collective compute operations such as All-Reduce, All-Gather, Reduce-Scatter, and/or All-to-All operations can be inserted to facilitate the compute slicing of the tensor contraction operations.

Figure 9:
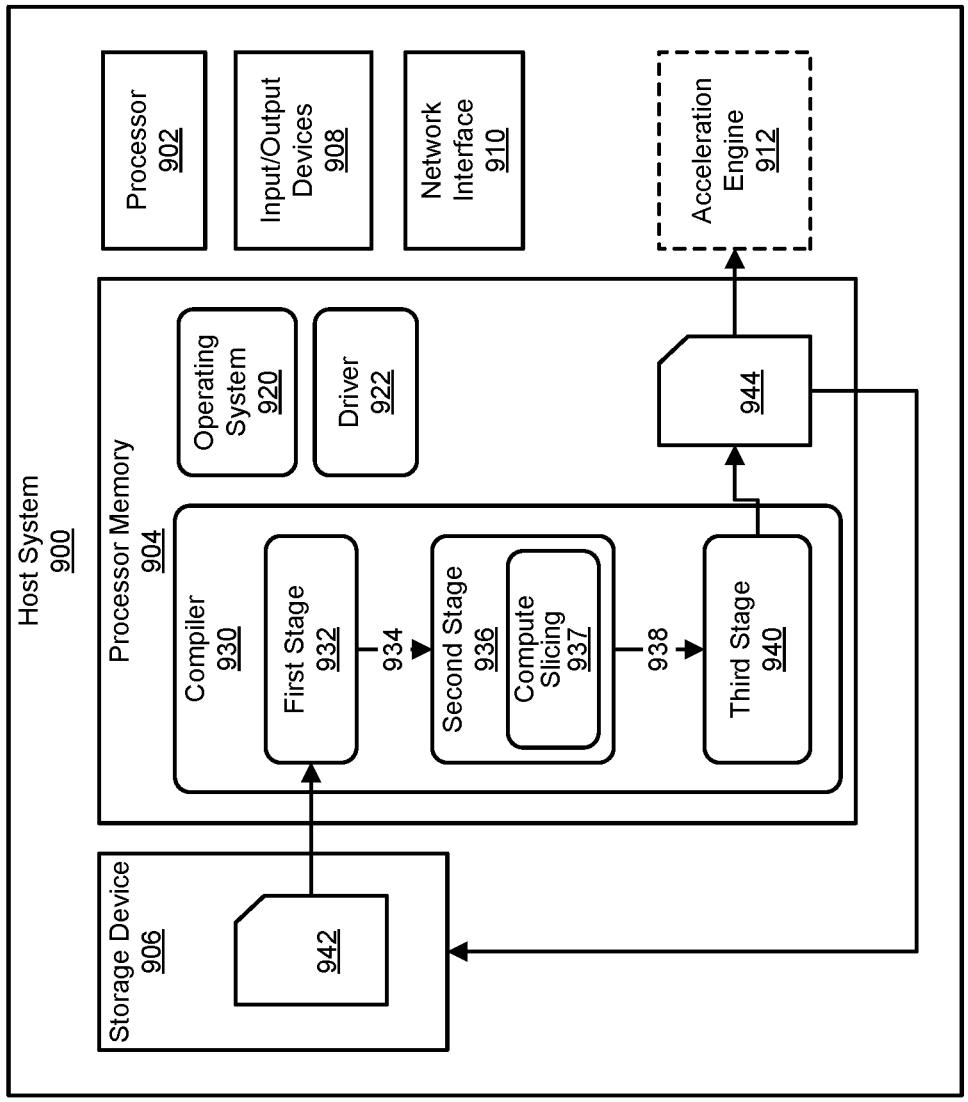
FIG. 9 illustrates a block diagram of an example of a compiler in a host system.

FIG. 9 illustrates a block diagram of an example of a host system 900 on which a compiler 930 can run. The illustrated host system 900 is an example of a computing device, and includes a processor 902, a processor memory 904, at least one storage device 906, various Input/Output (I/O) devices 908, and at least one network interface 910. In the example of FIG. 9, the host system 900 also includes an acceleration engine 912, which is an integrated circuit device that can accelerate certain operations or computations performed by the host system 900. In various examples, the host system 900 can be implemented as a server in a data center, a desktop computer, a laptop computer, a tablet computer, or a smartphone, among other examples. In some examples, operations or components discussed below as being performed or included in the host system 900 can be performed or included in other computer devices. For example, the compiler 930 can execute on the host system 900 while the acceleration engine 912 is located in a different host system or different computing device.

The processor 902 is an integrated circuit device that can execute program code, in the form of instructions. The program code can be for various software applications or tools, such as an operating system 920 or the illustrated compiler 930. While the processor 902 is executing a program, the instructions for the program can be stored in the processor memory 904. The instructions can also be stored elsewhere, such as on the storage device 906, and can be loaded into the processor memory 904 when needed by the processor 902. The processor 902 can also use the processor memory 904 for temporary storage of other data that the processor 902 is operating on. In various examples, the processor memory 904 is a volatile memory type, such as a type of random access memory, though non-volatile memory types can, alternatively or additionally, be used for the processor memory 904.

The storage device 906 is an example of a device that can include non-volatile memory. For example, the storage device 906 can be a magnetic disk drive, a solid-state drive, or an optical drive, among other examples. Program code and other data stored on the storage device 906 can remain present when the storage device 906 is not powered on. Storage device 906 can be uses as a type of non-transitory storage medium, or may include a reader that can access non-transitory storage medium.

The storage device 906 is one example of a peripheral device. A peripheral device is a component that can be coupled to the host system 900 to add functionality to the host system 900. Other examples of peripheral devices include Input/Output devices 908 and network interface 910. The Input/Output devices 908 can include user input and/or output devices, such as keyboard, mouse, pointer, touchpad, touchscreen, microphone, display screen, speaker, printer, and scanner, among other examples. Network interface 910, which can be implemented using a network interface card, can provide access to one or more networks. Network interface 910 can include, for example, a physical port for connecting a network cable and/or one or more antennas and/or radios for wireless communication such as Wi-Fi, cellular, and/or other over-the-air networks. Network interface 910 can also be described as an I/O device.

The acceleration engine 912 is also another type of peripheral device or I/O device. The acceleration engine 912 is a device that is purpose-built to perform certain operations that can be performed by the processor 902, but can be performed faster by the acceleration engine 912. For example, the acceleration engine 912 can be a neural network accelerator that is capable of performing large scale, parallel computations of a neural network more efficiently than when the computations are performed by the processor 902. As another example, the acceleration engine 912 can be a graphics processing unit (GPU), and may be optimized to perform the computations needed for graphics rendering. Other examples of devices that can be implemented by the acceleration engine 912 include cryptographic accelerators, compression and decompression accelerators, 3-D accelerators, regular expression accelerators, security accelerators, and others.

In various examples, the acceleration engine 912 can execute program code to perform certain operations. For example, when the acceleration engine 912 is a neural network accelerator, the acceleration engine 912 can be programmed to execute a particular neural network model, such as one that performs image recognition or one that performs machine translation. As a further example, to support the execution of a neural network model, the acceleration engine 912 can be programed to perform operations such as copying data for the neural network between processor memory 904 and the acceleration engine 912 (e.g., copying input data for the neural network from processor memory 904 into the acceleration engine 912, copying results from the acceleration engine 912 into the processor memory 904, etc.).

To generate program code for the acceleration engine 912, the host system 900 can execute the compiler 930. Compilers, in general, are software programs that translate program code written in a human-readable language into a format (e.g., machine instructions) that can be read and processed by an integrated circuit device. In the example of FIG. 9, the acceleration engine 912 can be a neural network accelerator, and the compiler 930 can be a compiler for compiling a neural network description into instructions to be executed by the acceleration engine 912. When the acceleration engine 912 implements a different type of accelerator, a different compiler can be used.

The compiler 930 can be activated, for example, when the operating system 920 receives keyboard, mouse, touchscreen, voice command, or other inputs from the Input/Output devices 908. The inputs can further include parameters for the compiler 930, such as input code 942 to compile and configuration options for the compilation process. Once the compiler 930 is activated, the processor 902 can load the instructions for the compiler 930 into the processor memory 904, and execute the compiler from the processor memory 904. In some implementations, compiler 930 may identifying steps to be performed by the processor 902, rather than by the acceleration engine 912. For example, the processor 902, through the execution of a driver 922, may need to perform steps such as configuring Direct Memory Access (DMA) descriptors for moving data into or out of the acceleration engine 912, among other examples.

In the example of FIG. 9, the compiler 930 includes a first stage 932, a second stage 936, and a third stage 940, which each perform different operations to produce compiled code 944. In other examples, the compiler 930 can combine the operations of the first stage 932, second stage 936, and/or third stage 940 into fewer stages, or can divide the operations of one or more of the stages into multiple stages. In some implementations, compiler 930 can also be modified such that certain operation(s) from one stage can be executed in a different stage.

The first stage 932 (may also be referred to as the front stage) can receive and process input code 942. The input code 942 can describe a program in a high-level programming language, such as Python, Java, C++, among other examples, and may utilize software libraries tailored for neural networks such as TensorFlow, PyTorch, etc. The input code 942 can be a description of a neural network model that describe, for example, steps to perform image recognition, speech recognition, machine translation, or other operations. The input code 942 can be obtained from the storage device 906. Alternatively, though not illustrated, the input code 942 can be located in the processor memory 904, or can be obtained from a network location using the network interface 910.

Processing of the input code 942 can include parsing the input code 942, performing syntax and semantic analysis on the input code 942 to identify operators (e.g., operations such as computations, memory accesses, and/or other functions, etc.) described in the input code 942, and sorting the operators described in the input code 942. For example, the operators described in the input code 942 can be sorted into layers, where the outputs of one layer provide the inputs to a next layer. The output of the first stage 932 can be an intermediate representation (IR) 934 of the input code 942. In some implementations, the IR 934 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 936 (may also be referred to as the middle-end stage) can perform intermediate processing on the IR 934 output from the first stage 932. The intermediate processing may include performing various optimizations on the IR 934. The optimizations may include target independent optimizations that are hardware agnostic, and/or target specific optimizations that are tailored for the hardware architecture executing the program of input code 942. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 912) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 912 to perform at the same time. The acceleration engine 912 may, for example, have a limited amount of local storage space for the data needed for a computation, or the computations may be more than the acceleration engine 912 can perform at one time. In such scenario, the operators of the layer or node can be broken down into smaller operations, which can fit into the acceleration engine's local memory and/or can fit into the computing capacity of the acceleration engine 912. The output of the second stage 936 can be an optimized IR 938 such as code representing an optimized compute graph. In some implementations, the compute-based slicing 937 described herein can be implemented in the second stage 936, although the compute-based slicing 937 can also be implemented in a different stage such as the third stage 940.

The third stage 940 (may also be referred to as the back-end stage) can operate on the output 938 of the second stage 936, and perform various steps before producing the instructions (e.g., machine code) that are to be executed by the acceleration engine 912. These steps can include instruction and data scheduling, register allocation, and/or code generation. Instruction and data scheduling determines the order in which instructions are executed and data are processed by the acceleration engine 912, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 912, and includes mapping operations into hardware instructions according to the architecture of the acceleration engine 912. The output of the third stage 940 is compiled code 944, which may include machine instructions in binary format. In some examples, the compiled code 944 can be stored in the processor memory 904. Alternatively or additionally, the compiled code 944 can be copied to the storage device 906 or to a network location. As noted above, the acceleration engine 912 may be located at a different host system, in which case the compiled code 944 can be sent over the network interface 910 to the other host system.

In the example of FIG. 9, the host system 900 can be executing a driver 922, which can also be referred to as a device driver or runtime driver, that manages the acceleration engine 912. The driver 922 can provide an interface between applications executing on the host system 900 (or on another host system) and the acceleration engine 912. For example, the driver 922 can provide an Application Program Interface (API) that defines functions for feeding input data to the acceleration engine 912 and defining the operation to perform on the input data. In this and other examples, the driver 922 can configure the acceleration engine 912 to perform the operation. For example, the driver 922 can identify a neural network model that the acceleration engine 912 is to execute, as well as the location in the processor memory 904 or on the storage device 906 where the compiled code 944 for the neural network model is located. The driver 922 can further load into the acceleration engine 912 or cause the acceleration engine 912 to load the compiled code 944, can load or cause the acceleration engine 912 to load the input data on which the neural network model is to operate, and/or can cause the acceleration engine 912 to begin executing on the input data. Once the acceleration engine 912 has finished, the acceleration engine 912 can notify the driver 922, and the driver 922 can deliver a result back to the application that requested the result.

Figure 10:
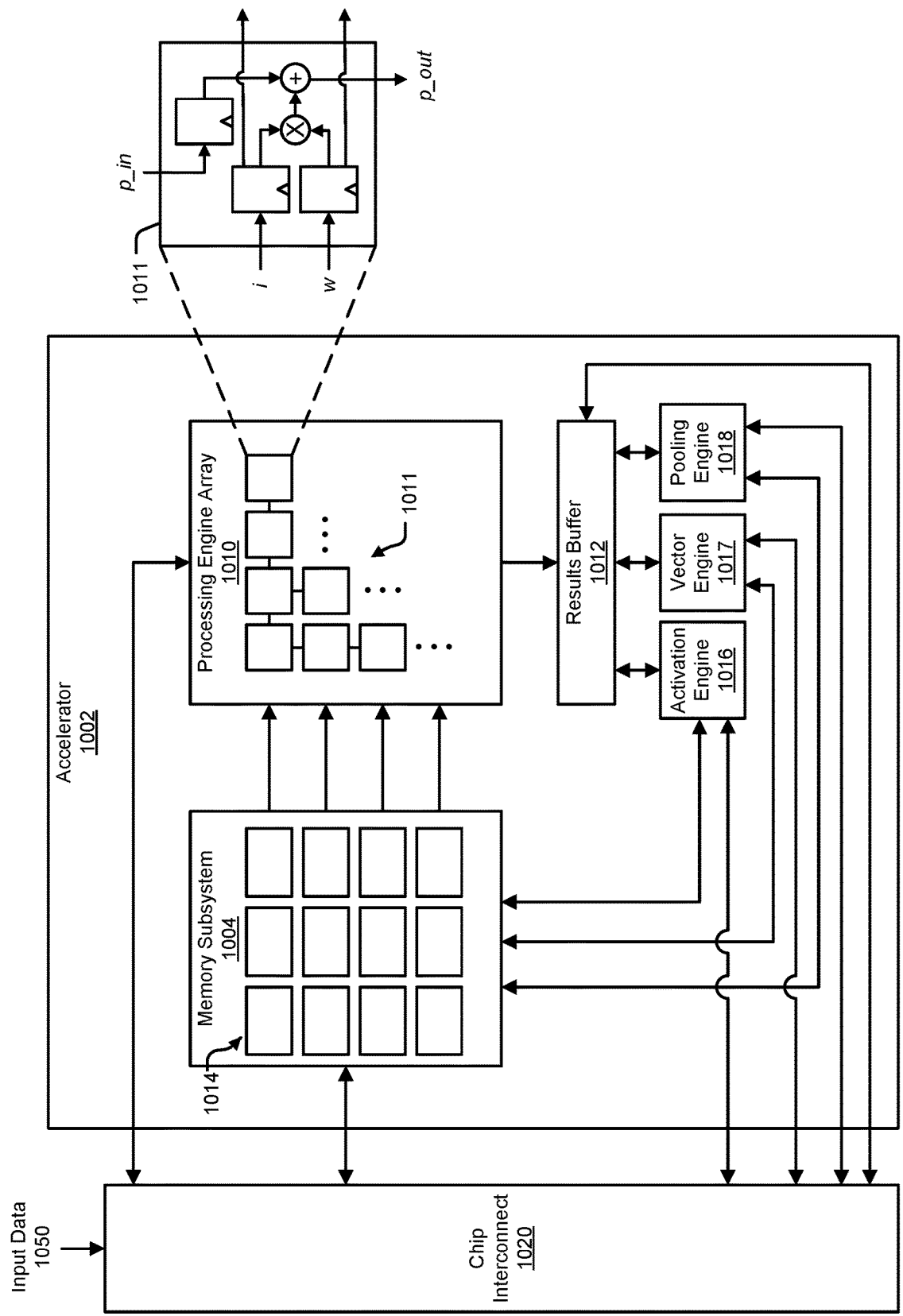
FIG. 10 illustrates a block diagram of an example of an integrated circuit device.

FIG. 10 is a block diagram illustrating an example of an accelerator 1002. In various examples, the accelerator 1002, for a set of input data (e.g., input data 1050), can execute computations using a processing engine array 1010, an activation engine 1016, a vector engine 1017, and/or a pooling engine 1018. In some examples, the example accelerator 1002 may be an integrated circuit component of a processor, such as a neural network processor. The processor may have other integrated circuit components, including additional accelerator engines.

In various implementations, the memory subsystem 1004 can include multiple memory banks 1014. Memory subsystem 1004 can also be referred to as a state buffer. In these implementations, each memory bank 1014 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1014. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1004 can permit simultaneous access to the read or write channels of multiple memory banks. As another example, the memory subsystem 1004 can include arbitration logic such that arbitration between, for example, the outputs of multiple memory banks 1014 can result in more than one memory bank's output being used. In these and other examples, though globally managed by the memory subsystem 1004, each memory bank can be operated independently of any other.

Having the memory banks 1014 be independently accessible can increase the efficiency of the accelerator 1002. For example, values can be simultaneously read and provided to each row of the processing engine array 1010, so that the entire processing engine array 1010 can be in use in one clock cycle. As another example, the memory banks 1014 can be read at the same time that results computed by the processing engine array 1010 are written to the memory subsystem 1004. In contrast, a single memory may be able to service only one read or write at a time. With a single memory, multiple clock cycles can be required, for example, to read input data for each row of the processing engine array 1010 before the processing engine array 1010 can be started.

In various implementations, the memory subsystem 1004 can be configured to simultaneously service multiple clients, including the processing engine array 1010, the activation engine 1016, the vector engine 1017, the pooling engine 1018, and any external clients that access the memory subsystem 1004 over a communication fabric 1020. In some implementations, being able to service multiple clients can mean that the memory subsystem 1004 has at least as many memory banks as there are clients. In some cases, each row of the processing engine array 1010 can count as a separate client. In some cases, each column of the processing engine array 1010 can output a result, such that each column can count as a separate write client. In some cases, output from the processing engine array 1010 can be written into the memory banks 1014 that can then subsequently provide input data for the processing engine array 1010. As another example, the activation engine 1016, the vector engine 1017, and the pooling engine 1018 can include multiple execution channels, each of which can be separate memory clients. The memory banks 1014 can be implemented, for example, using static random access memory (SRAM).

In various implementations, the memory subsystem 1004 can include control logic. The control logic can, for example, keep track of the address spaces of each of the memory banks 1014, identify memory banks 1014 to read from or write to, and/or move data between the memory banks 1014. In some implementations, memory banks 1014 can be hardwired to particular clients. For example, a set of memory banks 1014 can be hardwired to provide values to the rows of the processing engine array 1010, with one memory bank servicing each row. As another example, a set of memory banks can be hard wired to receive values from columns of the processing engine array 1010, with one memory bank receiving data for each column.

The processing engine array 1010 is the computation tensor of the example accelerator 1002. The processing engine array 1010 can, for example, execute parallel integration, convolution, correlation, and/or tensortensor contraction, among other things. The processing engine array 1010 includes multiple processing engines 1011, arranged in rows and columns, such that results output by one processing engine 1011 can be input directly into another processing engine 1011. Processing engines 1011 that are not on the outside edges of the processing engine array 1010 thus can receive data to operate on from other processing engines 1011, rather than from the memory subsystem 1004.

In various examples, the processing engine array 1010 uses systolic execution, in which data arrives at each processing engine 1011 from different directions at regular intervals. In some examples, input data can flow into the processing engine array 1010 from the left and weight values can be loaded at the top. In some examples weights and input data can flow from the left and partial sums can flow from top to bottom. In these and other examples, a multiply-and-accumulate operation moves through the processing engine array 1010 as a diagonal wave front, with data moving to the right and down across the array. Control signals can be input at the left at the same time as weights, and can flow across and down along with the computation.

In various implementations, the number of columns in the processing engine array 1010 determines the computational capacity of the processing engine array 1010, and the number of rows determines the required memory bandwidth for achieving maximum utilization of the processing engine array 1010. The processing engine array 1010 can have, for example, 64 columns and 128 rows, or some other number of columns and/or rows.

An example of a processing engine 1011 is illustrated in FIG. 10 in an inset diagram. As illustrated by this example, a processing engine 1011 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1011.

In the illustrated example, an input from above can include a partial sum, p_in, provided either from another processing engine 1011 or from a previous round of computation by the processing engine array 1010. When starting a computation for a new set of input data, the top row of the processing engine array 1010 can receive a fixed value for p_in, such as zero. As illustrated by this example, i and w are multiplied together and the result is summed with p_in to produce a new partial sum, p_out, which can be input into another processing engine 1011. Various other implementations of the processing engine 1011 are possible.

Outputs from the last row in the processing engine array 1010 can be temporarily stored in the results buffer 1012. The results can be intermediate results, which can be written to the memory banks 1014 to be provided to the processing engine array 1010 for additional computation. Alternatively, the results can be final results, which, once written to the memory banks 1014 can be read from the memory subsystem 1004 over the communication fabric 1020, to be output by the system.

In some implementations, the accelerator 1002 includes an activation engine 1016. In these implementations, the activation engine 1016 can combine the results from the processing engine array 1010 into one or more output activations. For example, for a convolutional neural network, convolutions from multiple channels can be summed to produce an output activation for a single channel. In other examples, accumulating results from one or more columns in the processing engine array 1010 may be needed to produce an output activation for a single node in the neural network. In some examples, activation engine 1016 can be bypassed.

In various examples, the activation engine 1016 can include multiple separate execution channels. In these examples, the execution channels can correspond to the columns of the processing engine array 1010, and can perform an operation on the outputs of a column, the result of which can be stored in the memory subsystem 1004. In these examples, the activation engine 1016 may be able to perform between 1 and n parallel computations, where n is equal to the number of columns in the processing engine array 1010. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1002 can include a pooling engine 1018. Pooling is the combining of outputs of the columns of the processing engine array 1010. Combining can include for example, computing a maximum value, a minimum value, an average value, a median value, a summation, a multiplication, or another logical or mathematical combination. In various examples, the pooling engine 1018 can include multiple execution channels that can operating on values from corresponding columns of the processing engine array 1010. In these examples, the pooling engine 1018 may be able to perform between 1 and n parallel computations, where n is equal to the number of columns in the processing engine array 1010. In various examples, execution channels of the pooling engine 1018 can operate in parallel and/or simultaneously. In some examples, the pooling engine 1018 can be bypassed.

In some implementations, the accelerator 1002 can further include a vector engine 1017. Vector engine 1017 is a compute engine that can perform computations and manipulations on values stored in memory subsystem 1004 and/or results buffer 1012 such as values representing tensors of input values, weight values, intermediate results, etc. Vector engine 1017 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1017 can operate in parallel and/or simultaneously. In some examples, the vector engine 1017 can be bypassed or be omitted.

Herein, the activation engine 1016, the vector engine 1017, and the pooling engine 1018 may be referred to collectively as execution engines. The processing engine array 1010 is another example of an execution engine. Another example of an execution engine is a Direct Memory Access (DMA) engine, which may be located outside the accelerator 1002.

Input data 1050 can arrive over the communication fabric 1020. The communication fabric 1020 can connect the accelerator 1002 to other components of a processor, such as a DMA engine that can obtain input data 1050 from an Input/Output (I/O) device, a storage drive, or a network interface. The input data 1050 can be, for example one-dimensional data, such as a character string or numerical sequence, or two-dimensional data, such as an array of pixel values for an image or frequency and amplitude values over time for an audio signal. In some examples, the input data 1050 can be three-dimensional, as may be the case with, for example, the situational information used by a self-driving car or virtual reality data. In some implementations, the memory subsystem 1004 can include a separate buffer for the input data 1050. In some implementations, the input data 1050 can be stored in the memory banks 1014 when the accelerator 1002 receives the input data 1050.

In some examples, the accelerator 1002 can implement a neural network processing engine. In these examples, the accelerator 1002, for a set of input data 1050, can execute a neural network to perform a task for which the neural network was trained. Executing a neural network on a set of input data can be referred to as inference or performing inference.

The weights for the neural network can be stored in the memory subsystem 1004, along with input data 1050 on which the neural network will operate. The neural network can also include instructions, which can program the processing engine array 1010 to perform various computations on the weights and the input data. The instructions can also be stored in the memory subsystem 1004, in the memory banks 1014 or in a separate instruction buffer. The processing engine array 1010 can output intermediate results, which represent the outputs of individual layers of the neural network. In some cases, the activation engine 1016, the vector engine 1017, and/or pooling engine 1018 may be enabled for computations called for by certain layers of the neural network. The accelerator 1002 can store the intermediate results in the memory subsystem 1004 for inputting into the processing engine array 1010 to compute results for the next layer of the neural network. The processing engine array 1010 can further output final results from a last layer of the neural network. The final results can be stored in the memory subsystem 1004 and then be copied out to host processor memory or to another location.

Figure 11:
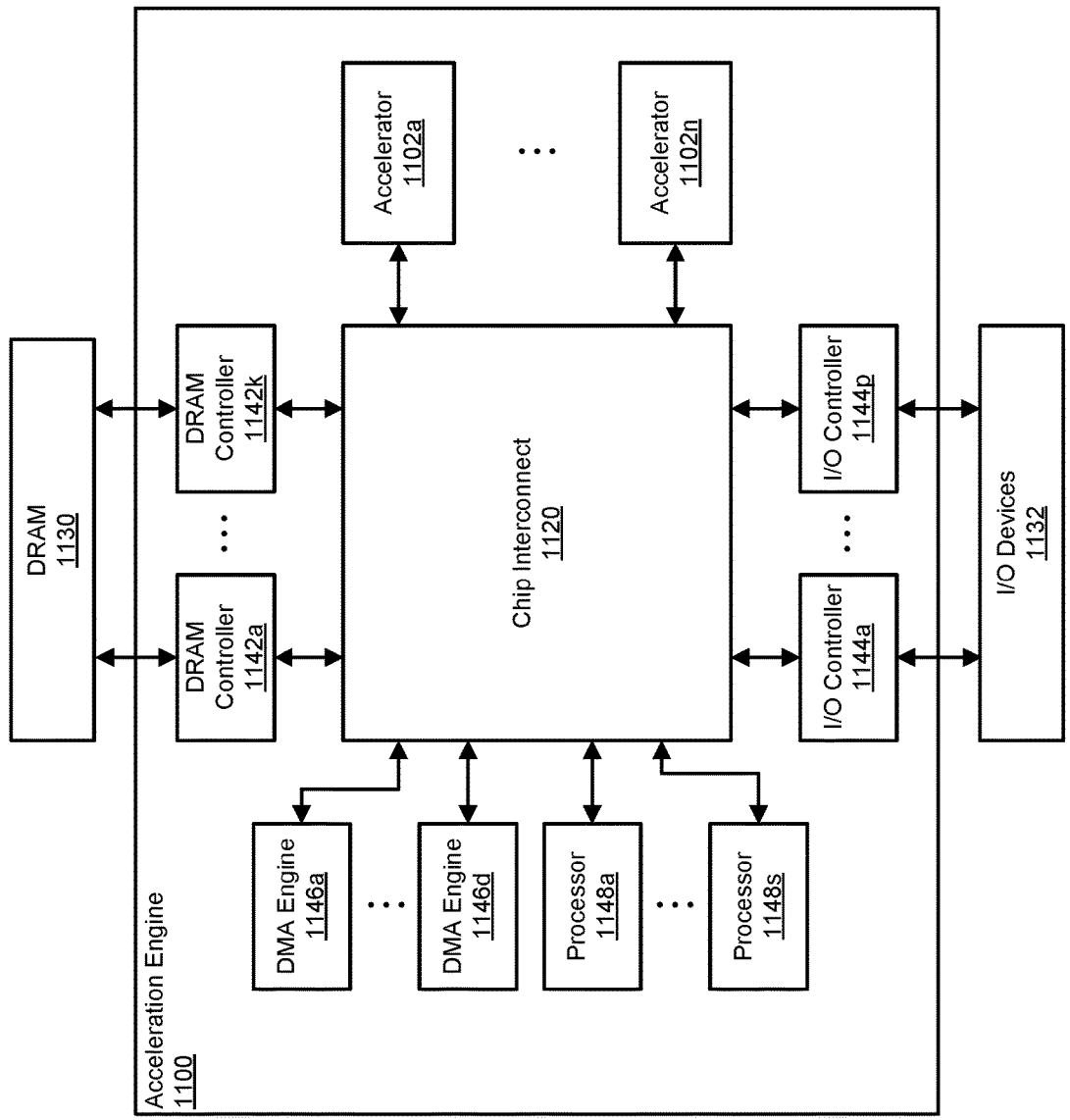
FIG. 11 illustrates a block diagram of an example of an acceleration engine.

FIG. 11 includes a block diagram that illustrates an example of an acceleration engine 1100. The acceleration engine 1100 is an example of an integrated circuit that can include one or more accelerators 1102*a*-1102*n* that may be similar to the accelerator illustrated in FIG. 10.

In the example of FIG. 11, the acceleration engine 1100 includes multiple accelerators 1102*a*-1102*n*, each of which can perform a set of operations. In various examples, the accelerators 1102*a*-1102*n* are for particular types of operations, so that the accelerators 1102*a*-1102*n* can perform the operations much faster than when similar operations are performed by a general-purpose processor. In various examples, to perform a set of operations, input data on which the operations are to be performed must first be moved into the accelerators 1102*a*-1102*n*. Additionally, in some cases, program code is also moved into the accelerators 1102*a*-1102*n*, which programs the operations that the accelerators 1102*a*-1102*n* will perform on the data. In the illustrated example, the acceleration engine 1100 includes n accelerators 1102*a*-1102*n*. Examples of accelerators that can be included in the acceleration engine 1100 include graphics accelerators, floating point accelerators, neural network accelerators, and others. In various examples, the accelerators 1102*a*-1102*n* can each be the same (e.g., each of the is a graphics accelerator) or can be different (e.g., the accelerators 1102*a*-1102*n* include a graphics accelerator, a floating point accelerator, and neural network accelerator).

The example acceleration engine 1100 further includes DRAM controllers 1142*a*-1142*k* for communicating with an external memory. The external memory is implemented, in this example, using DRAM 1130. In the illustrated example, the acceleration engine 1100 includes k DRAM controllers 1142*a*-1142*k*, each of which may be able to communicate with an independent set of banks of DRAM. In other examples, other types of RAM technology can be used for the external memory. The DRAM controllers 1142*a*-1142*k* can also be referred to as memory controllers.

In various examples, input data and/or program code for the accelerators 1102*a*-1102*n* can be stored in the DRAM 1130. Different programs can cause the accelerators 1102*a*-1102*n* to perform different operations. For example, when one of the accelerators is a neural network accelerator, one program can configure the neural network accelerator to perform speech recognition while another program can configure the neural network accelerator to perform image recognition. In various examples, different accelerators 1102*a*-1102*n* can be programmed with different programs, so that each performs a different set of operations. In various examples, the processors 1148*a*-1148*s* can manage moving of program code from the DRAM 1130 to the accelerators 1102*a*-1102*n*.

The example acceleration engine 1100 further includes I/O controllers 1144*a*-1144*p* for communicating with I/O devices 1132 in the system. The acceleration engine 1100 can communicate with I/O devices over, for example, a processor bus. In some examples, the processor bus can be implemented using Peripheral Component Interconnect (PCI) and/or a variation of the PCI bus protocol. The processor bus can connect the acceleration engine 1100 to I/O devices such as, for example, input and output devices, memory controllers, storage devices, and/or network interface cards, among other things. In some examples, the I/O controllers 1144-1144*p* can enable the acceleration engine 1100 to act as an I/O device for a host processor. For example, the acceleration engine 1100 can be the recipient of input data from the host processor, and a command indicating an operation to be performed on the input data (e.g., a particular computation or analysis). In the illustrated example, the acceleration engine 1100 includes p I/O controllers 1144*a*-1144*p*, each of which may include a separate root complex and may communicate with a separate set of I/O devices 1132. In other examples, other standardized bus protocols, such as Ultra Path Interconnect (UPI) can be used for the host bus. In other examples, a proprietary bus protocol can be used.

Movement of data in the acceleration engine 1100 can be managed by one or more processors 1148*a*-1148*s*, which can also be referred to as data management processors. In the example of FIG. 11, the acceleration engine 1100 includes s processors 1148*a*-1148*s* incorporated into the device (e.g., on the same silicon die). In other examples, the processors 1148*a*-1148*s* can be external to the acceleration engine 1100 (e.g., on a different die and/or in a different package). In some examples, the processors 1148*a*-1148*s* can manage the movement of data from I/O devices 1132 to the accelerators 1102*a*-1102*n* or the DRAM 1130. For example, input data may be located at an I/O device 1132 or in processor memory, and the processors 1148*a*-1148*s* can move the input from the I/O device 1132 or processor memory into an accelerator or into DRAM 1130. As another example, program code for the accelerators 1102*a*-1102*n* may be located on an I/O device 1132 or in processor memory.

The example acceleration engine 1100 further includes DMA engines 1146*a*-1146*d* that can move data between the accelerators 1102*a*-1102*n*, DRAM controllers 1142*a*-1142*k*, and I/O controllers 1144*a*-1144*p*. In the illustrated example, the acceleration engine 1100 includes d DMA engines 1146*a*-1146*d*. In some implementations, the DMA engines 1146*a*-1146*d* can be assigned to specific tasks, such as moving data from the DRAM controllers 1142*a*-1142*d* to the accelerators 1102*a*-1102*n*, or moving data between the I/O controllers 1144*a*-1144*p* and the accelerators 1102*a*-1102*n*. These tasks can be assigned, for example, by enqueueing descriptors with the DMA engines 1146*a*-1146*d*, where a descriptor identifies an address for a block of data and an operation (e.g., a read or a write) to perform. A descriptor, for example, can direct a DMA engine to instruct a DMA controller to read a block of data from DRAM 1130. A descriptor can, as a further example, instruct the DMA engine to write data, read by the DMA controller, to an accelerator. Further descriptors can be used to move data from an accelerator to DRAM 1130.

In various examples, each of the processors 1148*a*-1148*s* can be responsible for managing the data movement for a different accelerator. In some examples, a processor may manage the data movement for more than one accelerator. Similarly, in various examples, each of the processors 1148*a*-1148*s* can be assigned to one or more DMA engines 1146*a*-1146*d*. In these and other examples, associations between processors 1148*a*-1148*s*, accelerators 1102*a*-1102*n*, and DMA engines 1146*a*-1146*d* are determined by program code being executed by each respective processor.

In the example acceleration engine 1100, the various components can communicate over a chip interconnect 1120. The chip interconnect 1120 primarily includes wiring for routing data between the components of the acceleration engine 1100. In some cases, the chip interconnect 1120 can include a minimal amount of logic, such as multiplexors to control the direction of data, flip-flops for handling clock domain crossings, and timing logic.

Figure 12:
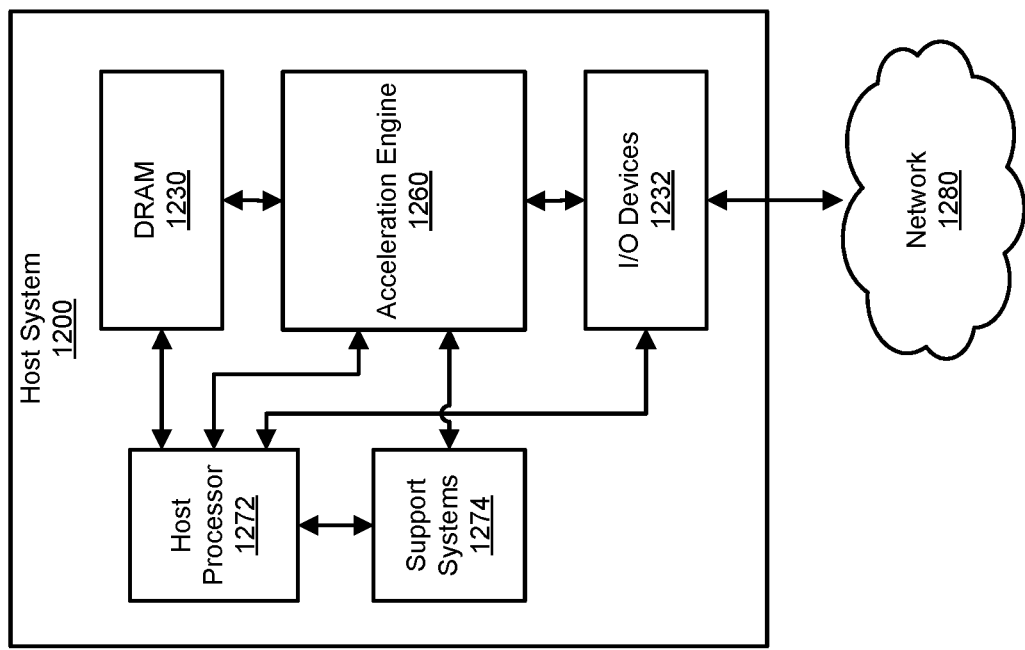
FIG. 12 illustrates a block diagram of an example of a host system.

FIG. 12 includes a block diagram that illustrates an example of a host system 1200 in which an acceleration engine 1260 can be used. The acceleration engine 1260 of FIG. 12 is an example of a device that can include one or more accelerators such as is illustrated in FIG. 11. The example host system 1200 of FIG. 12 includes the acceleration engine 1260, a host processor 1272, DRAM 1230 or processor memory, I/O devices 1232, and support systems 1274. In various implementations, the host system 1200 can include other hardware that is not illustrated here.

The host processor 1272 is a general-purpose integrated circuit that is capable of executing program instructions. In some examples, the host processor 1272 can include multiple processing cores. A multi-core processor may include multiple processing units within the same processor. In some examples, the host system 1200 can include more than one host processor 1272. In some examples, the host processor 1272 and the acceleration engine 1260 can be one chip, such as, one or more integrated circuits within the same package.

In various examples, the host processor 1272 can communicate with other components in the host system 1200 over one or more communication channels. For example, the host system 1200 can include a host processor bus, which the host processor 1272 can use to communicate with the DRAM 1230, for example. As another example, the host system 1200 can include an I/O bus, such as a PCI-based bus, over which the host processor 1272 can communicate with the acceleration engine 1260 and/or the I/O devices 1232, for example. In various examples, the host system 1200 can, alternatively or additionally, include other communication channels or busses, such as serial busses, power management busses, storage device busses, and so on.

In some examples, software programs executing on the host processor 1272 can receive or generate input for processing by the acceleration engine 1260. In some examples, the programs can select an appropriate neural network to execute for a given input. For example, a program may be for language translation, and can select one or more neural networks capable of speech recognition and/or machine translation. In these and other examples, the programs can configure the acceleration engine 1260 with the neural network to execute, and/or can select a neural network processing engine on the acceleration engine 1260 that has previously been configured to execute the desired neural network. In some examples, once the acceleration engine 1260 has started an inference on input data, the host processor 1272 can manage the movement of data (such as weights, instructions, intermediate results, results of conditional layers, and/or final results) into or out of the acceleration engine 1260.

In some examples, a software program that is using the acceleration engine 1260 to conduct an inference can read the result from a conditional layer from the acceleration engine 1260 and/or from a storage location, such as in DRAM 1230. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1230 is memory that is used by the host processor 1272 for storage of program code that the host processor 1272 is in the process of executing, as well as values that are being operated on. In some examples, the data for a neural network (e.g., weight values, instructions, and other data) can be all or partially stored in the DRAM 1230. DRAM is a common term for processor memory, and though DRAM is volatile memory, processor memory can be volatile and/or non-volatile. Though not illustrated here, the host system 1200 can include other volatile and non-volatile memories for other purposes. For example, the host system 1200 can include a Read-Only Memory (ROM) that stores boot code for booting the host system 1200 at power on, and/or Basic Input/Output System (BIOS) code.

Though not illustrated here, the DRAM 1230 can store instructions for various programs, which can be loaded into and be executed by the host processor 1272. For example, the DRAM 1230 can be storing instructions for an operating system, one or more data stores, one or more application programs, one or more drivers, and/or services for implementing the features disclosed herein.

The operating system can manage and orchestrate the overall operation of the host system 1200, such as scheduling tasks, executing applications, and/or controller peripheral devices, among other operations. In some examples, a host system 1200 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1200. For example, some drivers can provide communication between the operating system and peripheral devices or I/O devices 1232. Alternatively or additionally, some drivers may provide communication between application programs and the operating system, and/or application programs and peripheral devices accessible to the host system 1200. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1232 can include hardware for connecting to user input and output devices, such as keyboards, mice, pens, tablets, voice input devices, touch input devices, displays or monitors, speakers, and printers, among other devices. The I/O devices 1232 can also include storage drives and/or network interfaces for connecting to a network 1280. For example, the host system 1200 can use a network interface to communicate with storage devices, user terminals, other computing devices or servers, and/or other networks, among various examples.

In various examples, one or more of the I/O devices 1232 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1200 or may be in an external enclosure. A storage device can be fixed (e.g., attached by screws) or removable (e.g., having a physical release mechanism and possibly a hot-plug mechanism).

Storage devices, the DRAM 1230, and any other memory component in the host system 1200 are examples of computer-readable storage media. Computer-readable storage media are physical mediums that are capable of storing data in a format that can be read by a device such as the host processor 1272. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1232 can be PCI-based devices. In these examples, a PCI-based I/O device includes a PCI interface for communicating with the host system 1200. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1274 can include hardware for coordinating the operations of the acceleration engine 1260. For example, the support systems 1274 can include a microprocessor that coordinates the activities of the acceleration engine 1260, including moving data around on the acceleration engine 1260. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1272. In some examples, the program executed by the microprocessor is stored on the hardware of microprocessor, or on a non-volatile memory chip in the host system 1200. In some examples, the microprocessor and the acceleration engine 1260 can be on chip, such as one integrated circuit on the same die and in the same package.

In some examples, the support systems 1274 can be responsible for taking instructions from the host processor 1272 when programs executing on the host processor 1272 request the execution of a neural network. For example, the host processor 1272 can provide the support systems 1274 with a set of input data and a task that is to be performed on the set of input data. In this example, the support systems 1274 can identify a neural network that can perform the task, and can program the acceleration engine 1260 to execute the neural network on the set of input data. In some examples, the support systems 1274 only needs to select an appropriate neural network processing engine of the neural network processor. In some examples, the support systems 1274 may need to load the data for the neural network onto the acceleration engine 1260 before the acceleration engine 1260 can start executing the neural network. In these and other examples, the support systems 1274 can further receive the output of executing the neural network, and provide the output back to the host processor 1272.

In some examples, the operations of the support systems 1274 can be handled by the host processor 1272. In these examples, the support systems 1274 may not be needed and can be omitted from the host system 1200.

In various examples, the host system 1200 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1200 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for compiling a neural network model for execution on a neural network acceleration engine having multiple accelerators, the method comprising:
    obtaining a description of the neural network model;
    generating a representation of a compute flow graph of the neural network model, the compute flow graph having nodes corresponding to tensor operations and edges corresponding to data dependencies;
    performing data layout assignment for tensors used in the tensor operations;
    performing a compute-based slicing of the compute flow graph by:
    identifying a set of tensor contraction operations in the compute flow graph;
    for each of the tensor contraction operations:
    selecting a slicing option having a lowest cost to slice the tensor contraction operation into multiple tensor contraction portions, wherein a cost for slicing a tensor contraction operation includes an overhead to distribute tensor data to the multiple accelerators;
    slicing the tensor contraction operation according to the selected slicing option;
    propagating the selected slicing option to slice other tensor operations; and
    assigning the multiple tensor contraction portions and sliced tensor operations to the multiple accelerators, respectively, to have each accelerator perform a portion of the tensor contraction operation and sliced tensor operations; and
    inserting collective compute operations into the representation of the neural network model to facilitate performing the tensor contraction operations in the multiple accelerators; and
    generating machine instructions for execution of the neural network model on the multiple accelerators based on the compute-based slicing,
    wherein the machine instructions are executed on the multiple accelerators to implement the neural network model.

2. The computer-implemented method of claim 1, wherein the cost for slicing a tensor contraction operation that operates on a tensor result from a prior tensor contraction operation includes an overhead to resolve slicing mismatch between the tensor contraction operation and the prior tensor contraction operation.

3. The computer-implemented method of claim 1, further including performing additional tensor slicing after the compute-based slicing to keep memory usage of each accelerator to be within a memory capacity of the corresponding accelerator.

4. A computer-implemented method comprising:
    identifying a first tensor contraction operation in a compute flow;
    slicing the first tensor contraction operation into a first set of multiple tensor contraction portions to have each compute engine of a plurality of compute engines perform a portion of the first tensor contraction operation;
    determining a set of slicing options for a second tensor contraction operation that operates on a tensor result of the first tensor contraction operation;
    determining a cost for each slicing option in the set of slicing options for the second tensor contraction operation, wherein the cost for slicing the second tensor contraction operation includes an overhead to distribute tensor data to the plurality of compute engines;
    selecting a slicing option having a lowest cost;
    slicing the second tensor contraction operation according to the selected slicing option to have each compute engine perform a portion of the second tensor contraction operation;
    inserting collective compute operations in the compute flow for the first and second tensor contraction operations; and
    generating machine instructions for the compute flow, wherein the machine instructions are executed on the plurality of compute engines to perform the compute flow.

5. The computer-implemented method of claim 4, wherein the first tensor contraction operation is sliced along a left tensor free axis, and the collective compute operations include scattering a left tensor of the first tensor contraction operation, and duplicating a right tensor of the first tensor contraction operation.

6. The computer-implemented method of claim 4, wherein the first tensor contraction operation is sliced along a right tensor free axis, and the collective compute operations include duplicating a left tensor of the first tensor contraction operation, and scattering a right tensor of the first tensor contraction operation.

7. The computer-implemented method of claim 4, wherein the first tensor contraction operation is sliced along a contracted axis, and the collective compute operations include scattering a left tensor of the first tensor contraction operation, and scattering a right tensor of the first tensor contraction operation.

8. The computer-implemented method of claim 4, wherein determining the cost for each slicing option of the second tensor contraction operation includes determining a cost to resolve slicing mismatch on the tensor result of the first tensor contraction operation.

9. The computer-implemented method of claim 8, wherein no additional collective compute operation is used to resolve slicing mismatch when slicing both the first and second tensor contraction operations along respective left tensor free axes, or slicing the first tensor contraction operation along a right tensor free axis and the second tensor contraction operation along a contracted axis.

10. The computer-implemented method of claim 8, wherein an all-to-all collective compute operation is added to resolve slicing mismatch when slicing the first tensor contraction operation along a left tensor free axis and the second tensor contraction operation along a contracted axis, or slicing the first tensor contraction operation along a right tensor free axis and the second tensor contraction operation along a left tensor free axis.

11. The computer-implemented method of claim 8, wherein an all-gather collective compute operation is added to resolve slicing mismatch when slicing the first tensor contraction operation along a left tensor free axis and the second tensor contraction operation along a right tensor free axis, or slicing both the first and second tensor contraction operations along respective right tensor free axes.

12. The computer-implemented method of claim 8, wherein an all-reduce collective compute operation is added to resolve slicing mismatch when slicing the first tensor contraction operation along a contracted axis and the second tensor contraction operation along a right tensor free axis.

13. The computer-implemented method of claim 8, wherein a reduce-scatter collective compute operation is added to resolve slicing mismatch when slicing the first tensor contraction operation along a contracted axis and the second tensor contraction operation along a left tensor free axis, or slicing both the first and second tensor contraction operation along respective contracted axes.

14. The computer-implemented method of claim 4, wherein the first and second tensor contraction operations are represented as affine loopnests.

15. The computer-implemented method of claim 14, wherein slicing each of the first and second tensor contraction operations includes setting an axis being sliced to be an outermost loop of the respective affine loopnests, and parallelizing the outermost loop into multiple threads for the plurality of compute engines.

16. A non-transitory computer readable medium having stored therein instructions that, when executed by one or more processors, cause the one or more processors to execute a compiler, the compiler performing operations including: identifying a first tensor contraction operation in a compute flow;
    slicing the first tensor contraction operation into a first set of multiple tensor contraction portions to have each compute engine of a plurality of compute engines perform a portion of the first tensor contraction operation;
    determining a set of slicing options for a second tensor contraction operation that operates on a tensor result of the first tensor contraction operation;
    determining a cost for each slicing option in the set of slicing options for the second tensor contraction operation, wherein the cost for slicing the second tensor contraction operation includes an overhead to distribute tensor data to the plurality of compute engines;
    selecting a slicing option having a lowest cost;
    slicing the second tensor contraction operation according to the selected slicing option to have each compute engine perform a portion of the second tensor contraction operation;
    inserting collective compute operations in the compute flow for the first and second tensor contraction operations; and
    generating machine instructions for the compute flow, wherein the machine instructions are executed on the plurality of compute engines to perform the compute flow.

17. The non-transitory computer readable medium of claim 16, wherein determining the cost for each slicing option of the second tensor contraction operation includes determining a cost to resolve slicing mismatch on the tensor result of the first tensor contraction operation.

18. The non-transitory computer readable medium of claim 16, wherein the first and second tensor contraction operations are represented as affine loopnests.

19. The non-transitory computer readable medium of claim 18, wherein slicing each of the first and second tensor contraction operations includes setting an axis being sliced to be an outermost loop of the respective affine loopnests, and parallelizing the outermost loop into multiple threads for the plurality of compute engines.

* * * * *